United States Patent
Higuchi et al.

(10) Patent No.: US 10,986,275 B2
(45) Date of Patent: Apr. 20, 2021

(54) IMAGE DISPLAY APPARATUS, ON-VEHICLE SYSTEM, AND IMAGE DISPLAY METHOD

(71) Applicant: Ricoh Company, Ltd., Tokyo (JP)

(72) Inventors: Miho Higuchi, Kanagawa (JP); Takuro Yasuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 15 days.

(21) Appl. No.: 16/051,718

(22) Filed: Aug. 1, 2018

(65) Prior Publication Data

US 2018/0352164 A1  Dec. 6, 2018

Related U.S. Application Data

(63) Continuation of application No. PCT/JP2017/001757, filed on Jan. 19, 2017.

(30) Foreign Application Priority Data

Feb. 9, 2016 (JP) .............................. JP2016-023004

(51) Int. Cl.
*H04N 5/232* (2006.01)
*H04N 9/31* (2006.01)
(Continued)

(52) U.S. Cl.
CPC ......... *H04N 5/23293* (2013.01); *B60K 35/00* (2013.01); *G01C 21/26* (2013.01);
(Continued)

(58) Field of Classification Search
None
See application file for complete search history.

(56) References Cited

U.S. PATENT DOCUMENTS

| 8,089,549 B2 | 1/2012 | Yasuda et al. |
| 8,089,553 B2 | 1/2012 | Suzuki et al. |

(Continued)

FOREIGN PATENT DOCUMENTS

| JP | 2007-171669 | 7/2007 |
| JP | 2009-237530 | 10/2009 |

(Continued)

OTHER PUBLICATIONS

Extended Search Report dated Jan. 31, 2019 in European Patent Application No. 17750046.9.

(Continued)

*Primary Examiner* — Krishna P Neupane
(74) *Attorney, Agent, or Firm* — Xsensus LLP

(57) ABSTRACT

An image display apparatus includes a light source emitting light; an optical scanner scanning a predetermined scanning zone with light from the light source to render a display image; a light intensity detector detecting a light intensity of light from the light source; a memory storing relationships between control currents provided to the light source and light intensities; and one or more processors controlling, on the basis of the control current and light intensity relationships stored in the memory, a control current to display the display image with light from the light source. When the optical scanner scans an area outside the display image, the one or more processors detect by the light intensity detector a light intensity of light for the scanning, and update on the basis of the light intensity the relationships stored in the memory.

12 Claims, 15 Drawing Sheets

(51) Int. Cl.
  *G09G 5/00* (2006.01)
  *G01C 21/26* (2006.01)
  *B60K 35/00* (2006.01)
  *G03B 21/00* (2006.01)
  *G03B 21/14* (2006.01)
  *G02B 27/01* (2006.01)
  *G09G 3/02* (2006.01)
  *G02B 26/10* (2006.01)

(52) U.S. Cl.
  CPC ............ *G02B 26/10* (2013.01); *G02B 27/01* (2013.01); *G03B 21/00* (2013.01); *G03B 21/14* (2013.01); *G09G 3/02* (2013.01); *G09G 5/00* (2013.01); *H04N 9/3129* (2013.01); *H04N 9/3135* (2013.01); *H04N 9/3152* (2013.01); *H04N 9/3155* (2013.01); *H04N 9/3158* (2013.01); *H04N 9/3161* (2013.01); *H04N 9/3164* (2013.01); *H04N 9/3194* (2013.01)

(56) References Cited

U.S. PATENT DOCUMENTS

| | | | |
|---|---|---|---|
| 8,494,352 B2 | 7/2013 | Yasuda et al. | |
| 8,599,272 B2 | 12/2013 | Yasuda | |
| 8,860,866 B2 | 10/2014 | Yasuda et al. | |
| 9,219,865 B2 | 12/2015 | Yasuda et al. | |
| 9,349,348 B2 | 5/2016 | Haruna et al. | |
| 2014/0152711 A1* | 6/2014 | Sekiya | G03B 21/006 345/690 |
| 2014/0192330 A1 | 7/2014 | Imai | |
| 2014/0253527 A1 | 9/2014 | Ogi et al. | |
| 2014/0285536 A1 | 9/2014 | Haruna et al. | |
| 2015/0062345 A1* | 3/2015 | Kusanagi | G02B 27/0149 348/162 |
| 2015/0161926 A1* | 6/2015 | Ogi | H04N 9/3129 345/207 |
| 2015/0260984 A1* | 9/2015 | Yamakawa | H04N 9/3129 345/591 |
| 2016/0065857 A1 | 3/2016 | Yasuda et al. | |
| 2018/0197493 A1* | 7/2018 | Yamakawa | G09G 3/002 |

FOREIGN PATENT DOCUMENTS

| | | |
|---|---|---|
| JP | 2010-054879 | 3/2010 |
| JP | 2011-090076 | 5/2011 |
| JP | 2013-246236 | 12/2013 |
| JP | 2014-132295 | 7/2014 |
| JP | 2014-132302 | 7/2014 |
| JP | 2014-174292 A | 9/2014 |
| JP | 2014-186078 | 10/2014 |
| JP | 2015-129783 A | 7/2015 |
| JP | 2015-162526 | 9/2015 |

OTHER PUBLICATIONS

International Search Report dated Apr. 18, 2017 in PCT/JP2017/001757 filed on Jan. 19, 2017 (with English Translation).
Written Opinion dated Apr. 18, 2017 in PCT/JP2017/001757 filed on Jan. 19, 2017.

* cited by examiner

IMAGE DISPLAY APPARATUS, ON-VEHICLE SYSTEM, AND IMAGE DISPLAY METHOD

CROSS-REFERENCE TO RELATED APPLICATIONS

The present patent application is a continuation application of International Application No. PCT/JP2017/001757, filed Jan. 19, 2017, which claims priority to Japanese Patent Application No. 2016-023004 filed Feb. 9, 2016. The contents of these applications are incorporated herein by reference in their entirety.

FIELD OF THE INVENTION

The present invention relates to an image display apparatus, an on-vehicle system, and an image display method.

BACKGROUND ART

A laser-scanning-type projector is adopted in an on-vehicle HUD that has a navigation function for a vehicle driver, and so forth, because the laser-scanning-type projector has satisfactory visibility, enabling implementation of a clear contrast. In such a HUD, in order to reduce an uncomfortable feeling of a viewer such as a driver, light control technology of changing brightness of a display image of a HUD depending on the outside light is known.

Patent document 1 discloses a laser-beam display apparatus for maintaining reproducibility of a video signal in an on-vehicle HUD regardless of the intensity of the outside light. The laser-beam display apparatus according to Patent document 1 has a plurality of light control LUTs (look-up tables) storing light control intensities for respective steps of a plurality of light control steps with gradation levels used as indexes. According to the technology of Patent document 1, with reference to the previously stored light control LUTs, the brightness of laser light is controlled according to input light control settings and video signals.

SUMMARY

An image display apparatus of one aspect of the present invention includes a light source to emit light; an optical scanner to scan a predetermined scanning zone with light from the light source to render a display image; a light intensity detector to detect a light intensity of light from the light source; a memory to store relationships between control currents provided to the light source and the light intensities; and one or more processors configured to control the control current to display the display image with light from the light source on the basis of the relationships between the control currents and the light intensities stored in the memory. The one or more processors are further configured to, when the optical scanner scans an area outside the display image, detect a light intensity of light with which the area is scanned by the light intensity detector, and configured to update, by the one or more processors, on the basis of the light intensity, the relationships between control currents and light intensities stored in the memory.

DESCRIPTION OF EMBODIMENTS

An object of the embodiments of the present invention is to provide an image display apparatus capable of displaying a display image having various gradations with high precision.

In the embodiments of the present invention now being described in detail, it is possible to provide an image display apparatus capable of displaying a display image having various gradations with high precision.

According to embodiments that will now be described, it is possible to avoid degradation of image quality of a display image such as color shift otherwise occurring due to specific characteristics of a laser light source such as temperature change or aged deterioration so as to display the display image having various gradations with high preciseness.

Hereinafter, the embodiments of the present invention will be described with reference to the drawings. Note that the same reference signs are given to common elements of each embodiment that will now be described and duplicate description will be omitted.

Below, mainly a hardware configuration example of an automotive HUD 200 (hereinafter, simply referred to as a HUD 200) that is common to a first embodiment and a second embodiment will be described.

Figure 1:
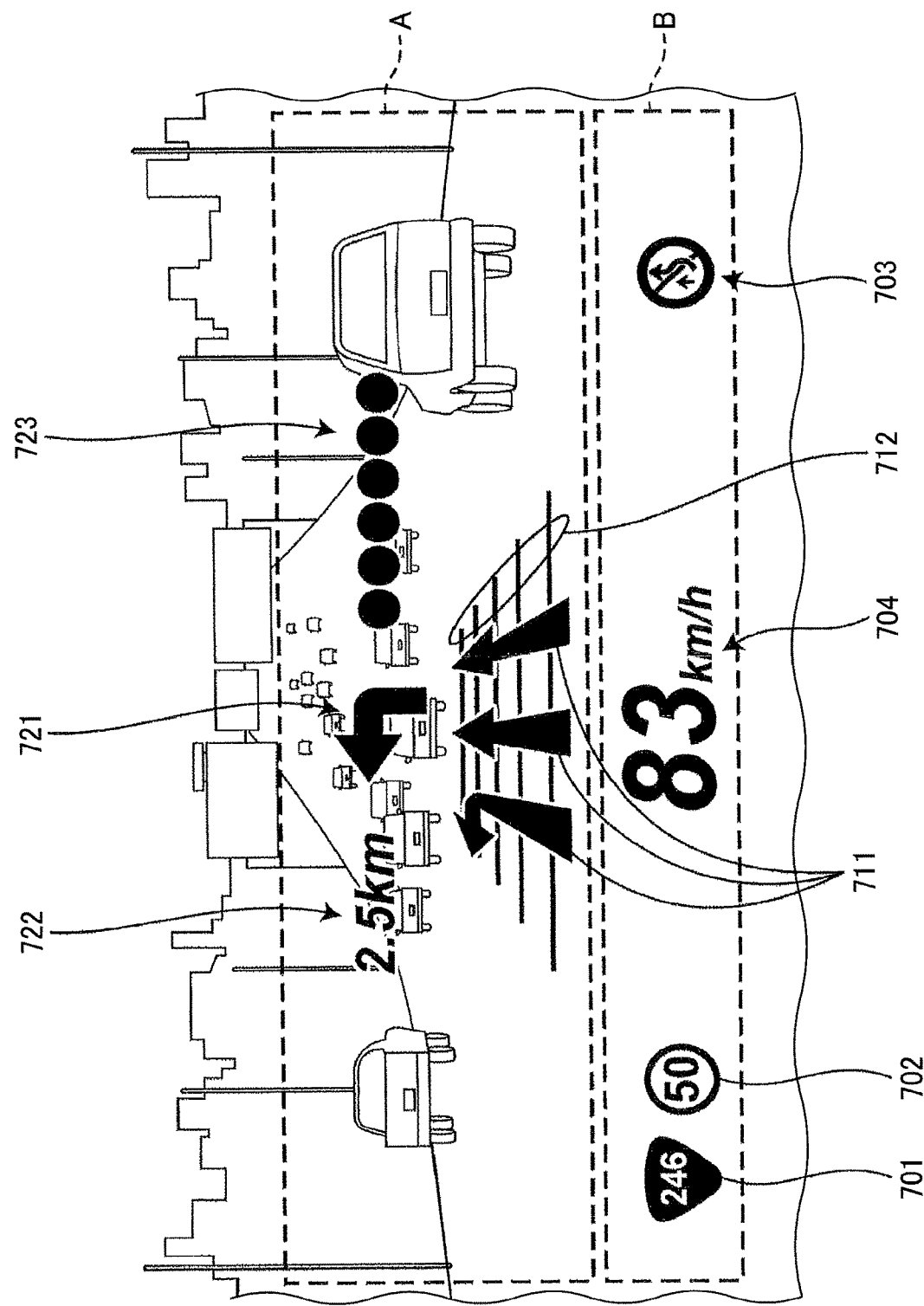
FIG. 1 is a front view illustrating one example of a virtual image displayed by an automotive HUD 200 according to an embodiment of the present invention in a state where the virtual image is superposed on a landscape in front of a vehicle 301 being able to be seen by a driver 300 through a windshield 302.
Figure 2:
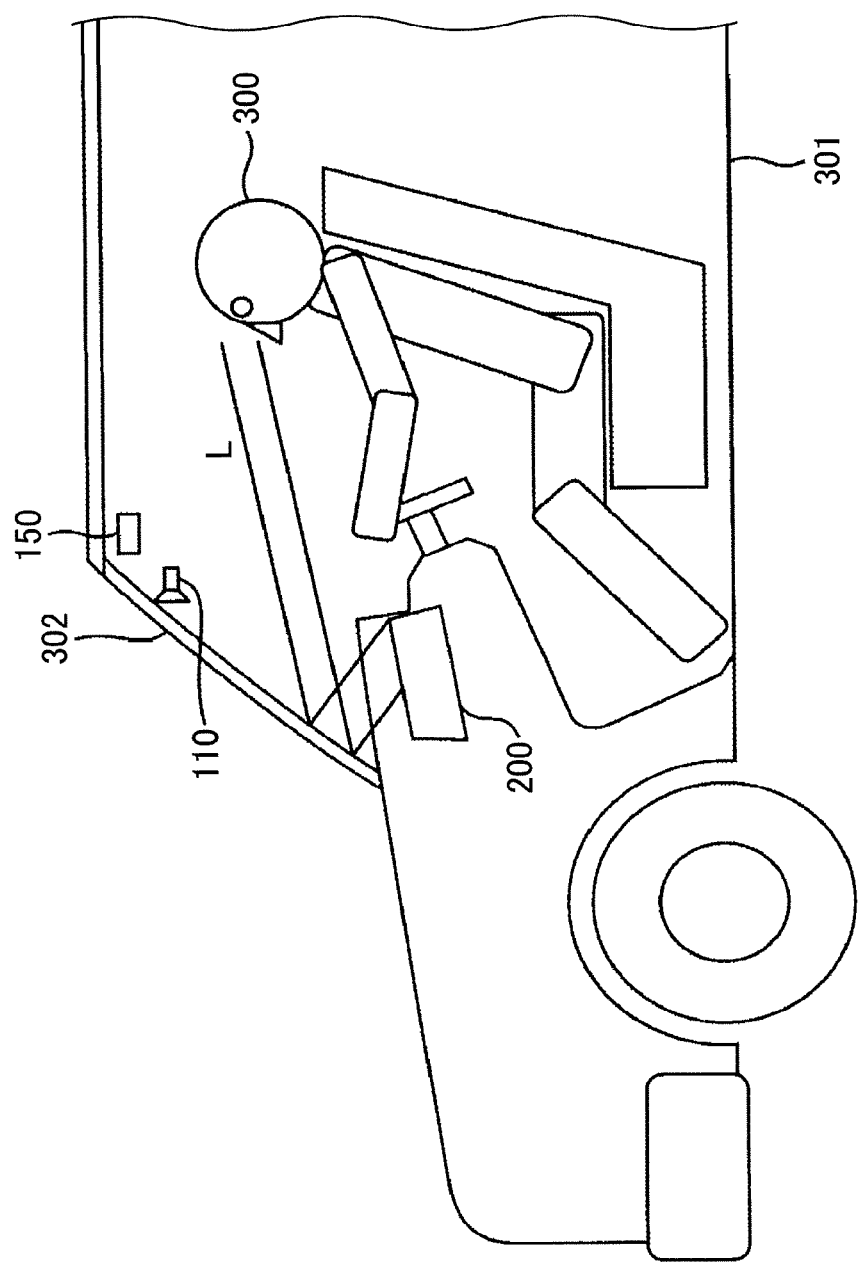
FIG. 2 is a partially-cutaway schematic side view schematically illustrating an inner arrangement of an automobile in which the automotive HUD 200 according to the embodiment is installed.
Figure 3:
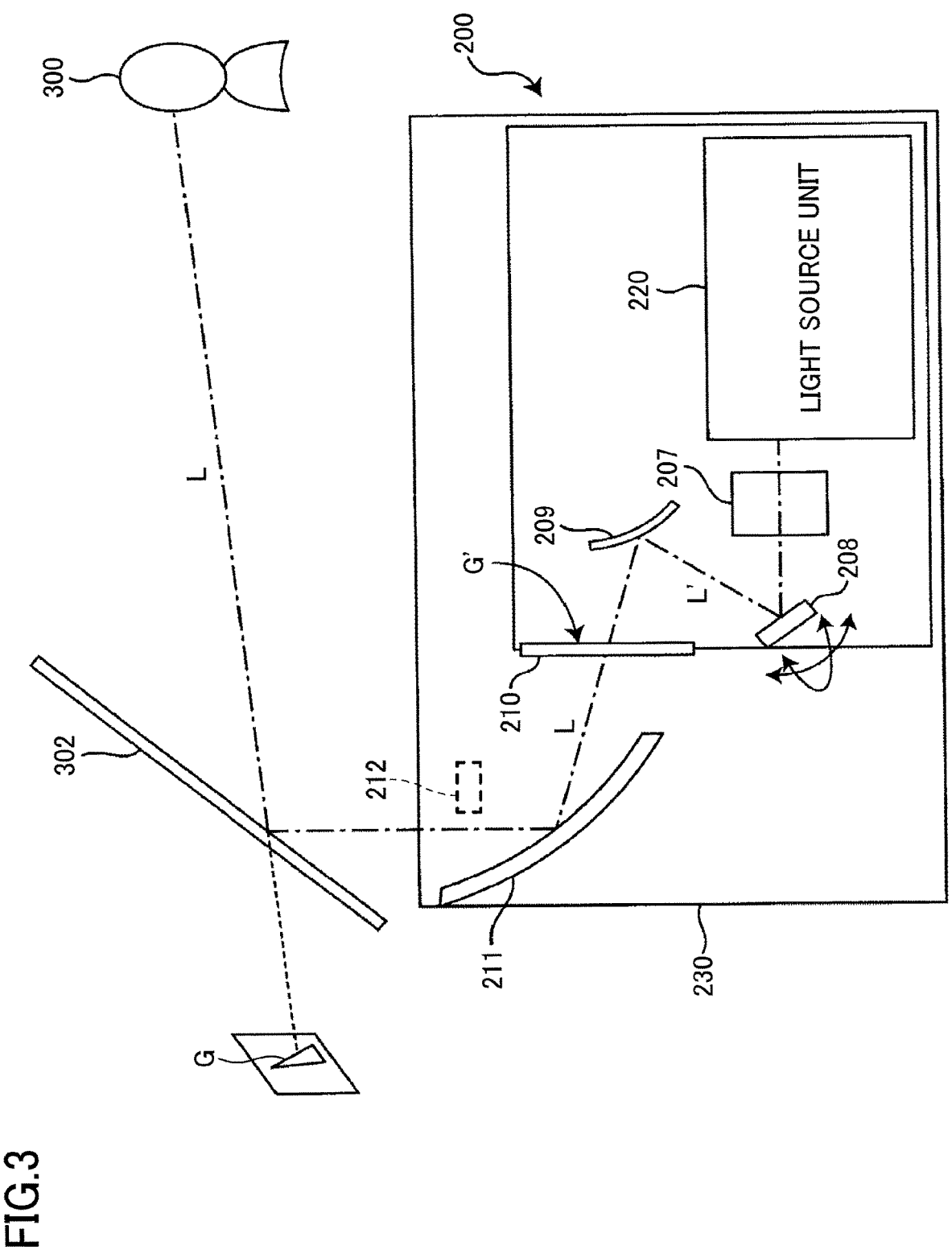
FIG. 3 is a block diagram schematically illustrating an internal configuration example of an optical system 230 of the automotive HUD 200 of FIG. 2.
Figure 4:
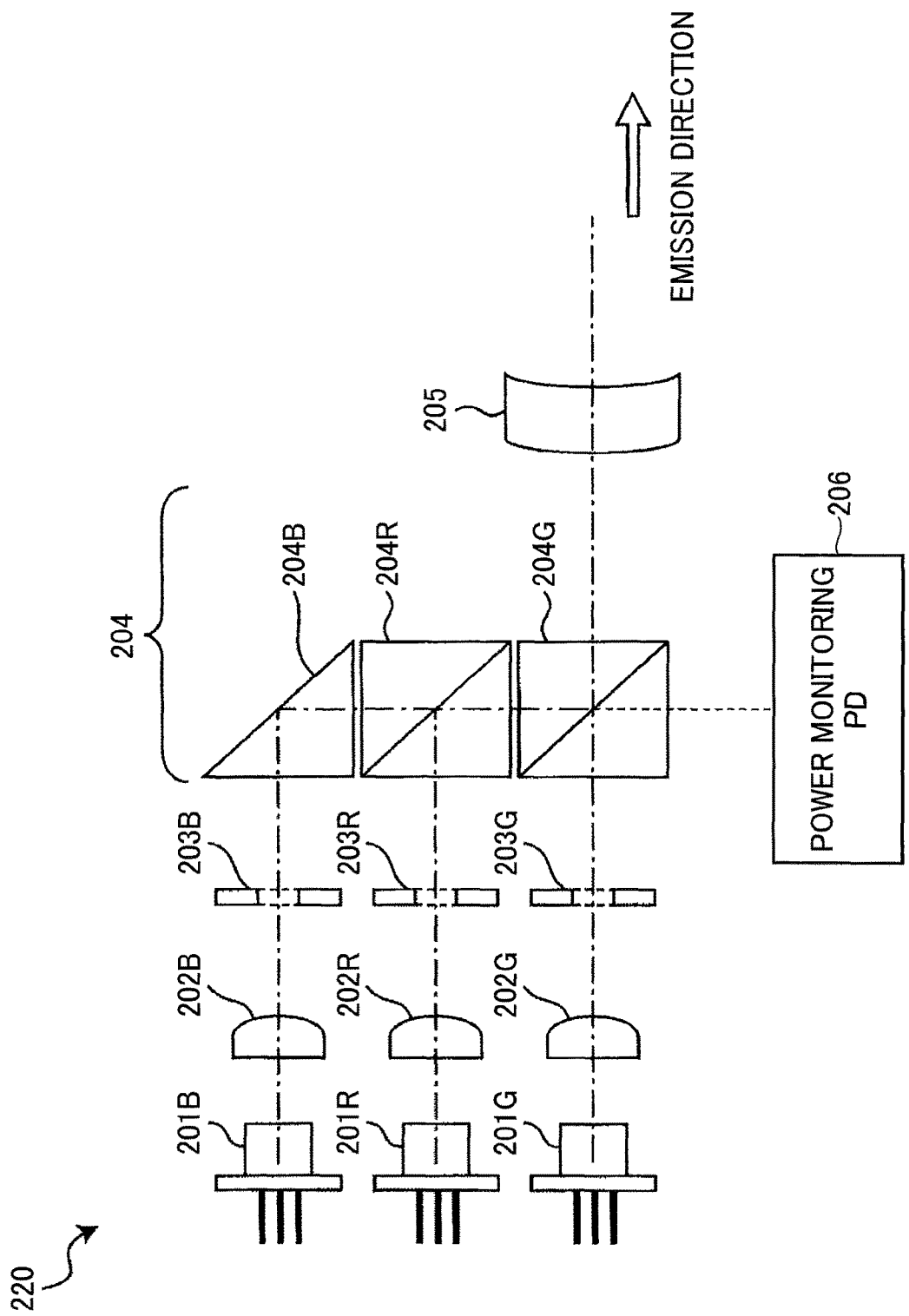
FIG. 4 is a block diagram illustrating an internal configuration example of a light source unit 220 of an optical system 230 of FIG. 3.

FIG. 1 is a front view illustrating one example of a virtual image displayed by the HUD 200 in a state where the virtual image is superposed on a landscape in front of a vehicle 301 being able to be seen by a driver through a windshield 302. FIG. 2 is a partially-cutaway schematic side view schematically illustrating an inner arrangement of an automobile in which the HUD 200 according to each embodiment is installed. FIG. 3 is a block diagram schematically illustrating a configuration example of an optical system of the HUD 200 of FIG. 2. FIG. 4 is a block diagram illustrating an internal configuration example of a light source unit 220 of an optical system 230 of FIG. 3.

In FIG. 2, the HUD 200 according to each embodiment is installed, for example, inside a dashboard of the vehicle 301 that is a traveling body as a mobile body. Projected light L that is image light emitted by the HUD 200 inside the dashboard is reflected by the windshield 302 that is a light transmissive member, and the driver 300 who is a viewer is irradiated with the projected light L. Thus, the driver 300 can see a HUD display image such as a route navigation image described later as a virtual image G. It is also possible that a combiner is installed as a light transmissive member on the inner wall of the windshield 302, and the projected light L reflected by the combiner allows the driver 300 to see the virtual image G.

At an upper portion of the windshield 302, a forward shooting camera 110 and an environment light sensor 150 are arranged. The forward shooting camera 110 takes a picture of a forward view that includes display information displayed by the HUD 200 onto the windshield 302 and a background of the display information viewed through the windshield 302. The environment light sensor 150 detects lightness (or illuminance) and chromaticity of environment light surrounding the display image.

According to each embodiment, the optical system of the HUD 200 and so forth are designed in such a manner that the distance from the driver 300 to the virtual image G is greater than or equal to 5 m. In a conventional common automotive HUD, a distance from a driver 300 to a virtual image is approximately 2 m. Normally, a driver carefully watches a forward infinite point of the vehicle, or carefully watches a preceding vehicle at several tens of meters. In a case where the driver who has focused on such a distant position will see a virtual image at 2 m, the focal length varies greatly. As a result, the driver is to greatly move the lenses of the eyes. Thus, a focus adjustment time taken until the virtual image is focused may increase, a time may be taken for the driver to recognize the contents of the virtual image, and the eyeballs of the driver 300 may become easily tired. Further, it may be not easy for the driver to notice the contents of the virtual image, and it may be difficult to appropriately provide information to the driver with the virtual image.

As a result of the distance to the virtual image G being greater than or equal to 5 m in each embodiment, an amount by which the driver 300 moves the lenses of the eyes is reduced from the amount of the conventional case, and the focus adjustment time taken until the virtual image G is focused is reduced so that the driver can rapidly recognize the contents of the virtual image G. Further, it is possible to reduce tiredness of the eyeballs of the driver 300. Further, the driver 300 can easily notice the contents of the virtual image G, and it is possible to appropriately provide information to the driver 300 with the virtual image G easily. In a case where the distance up to the virtual image G is greater than or equal to 5 m, the driver 300 can focus on the virtual image G almost without performing convergence movement of the eyeballs. Accordingly, it is possible to suppress a reduction in an advantageous effect to enable perception of a sense of distance (a change in the perceivable distance) and a sense of depth (a difference in the perceivable distance) with the use of motion parallax, the reduction otherwise occurring due to the eyeballs' convergence movement. Thus, it is possible to effectively obtain an advantageous effect for the driver to perceive information with the use of the sense of distance and the sense of depth of the image.

The HUD 200 illustrated in FIG. 3 includes a light source unit 220 where light source equipment is included in an optical housing as a unit in the optical system 230. The HUD 200 further includes a light intensity adjustment unit 207, an optical scanning apparatus 208 as an optical scanner, a free-curved mirror 209, a micro-lens array 210 as a light divergence member, and a projection mirror 211 as a light reflecting member.

The light source unit 220 of FIG. 4 includes red, green, and blue laser light sources 201R, 201G, and 201B; coupling lenses 202R, 202G, and 202B and apertures 203R, 203G, and 203B for the respective laser light sources; and a combining device 204. The light source unit 220 further includes a meniscus lens 205 and a power monitoring PD (photodiode) 206.

The laser light sources 201B, 201R, and 201G of FIG. 4 include light source devices each including one or more light emission points such as LDs (semiconductor laser devices). The respective laser light sources 201B, 201R, and 201G emit beams having different wavelengths such as λB=445 nm, λR=640 nm, and λG=530 nm. The beams from the respective laser light sources 201B, 201R, and 201G are incident on the apertures 203B, 203R, and 203G through the respective coupling lenses 202B, 202R, and 202G, are shaped in accordance with the opening shapes of the respective apertures, and are incident on the combining device 204. The opening shapes of the apertures 203B, 203R, and 203G are determined in accordance with the beams' angles of divergence and so forth. For example, the opening shapes of the apertures 203B, 203R, and 203G can be determined as various shapes such as a circular shape, an elliptical shape, a rectangular shape, or a square shape.

The combining device 204 includes a plurality of dichroic mirrors 204B, 204R, and 204G. The respective dichroic mirrors 204B, 204R, and 204G have plate shapes or prism shapes, and are disposed to face the apertures 203B, 203R, and 203G, respectively. The dichroic mirror 204B reflects light near the wavelength λB, the dichroic mirror 204R transmits light near the wavelength λB and reflects light near the wavelength λR, and the dichroic mirror 204G transmits light near the wavelength 2G and reflects light near the wavelength and light near the wavelength λR. According to this optical property, the combining device 204 combines beams from the respective laser light sources 201B, 201R, and 201G. The optical scanning apparatus 208 of FIG. 3 is irradiated with the combined beam through the meniscus lens 205 having the concave surface that faces the reflection surface of the optical scanning apparatus 208.

Further, the dichroic mirror 204G of the combining device 204 has an optical property to partially reflect light near the wavelength λG and to partially transmit light near the wavelength λB and light near the wavelength λR. According to this optical property of the combining device 204, the power monitoring PD 206 is irradiated with part of light from the respective laser light sources 201B, 201R, and 201G by the combining device 204. As will be described later in detail, the power monitoring PD 206 is a photodiode to be used to detect a light intensity of laser light from the laser light sources 201B, 201R, and 201G, and is one example of a light intensity detector in the HUD 200.

The HUD 200 according to each embodiment allows the driver 300 to see an enlarged image of an intermediate image formed on the micro-lens array 210 as the virtual image G by projecting the intermediate image onto the windshield 302 of the vehicle 301. Laser light of the respective colors emitted from the laser light sources 201R, 2016, and 201B is combined in the light source unit 220. The light intensity of the combined laser light is adjusted by the light intensity adjustment unit 207, and then is two-dimensionally deflected by scanning operation of the mirror of the optical scanning device 208. The scanning light L' two-dimensionally deflected by scanning operation of the mirror of the optical scanning device 208 is reflected by the free-curved mirror 209 so that distortion is corrected. The light of which the distortion has been corrected is condensed onto the micro-lens array 210 and renders the intermediate image.

Note that, according to each embodiment, the micro-lens array 210 is used as the light divergence member to divergently emit beams corresponding to respective pixels of the intermediate image G' (the respective points of the intermediate image) separately. However, it is possible to use another light divergence member. Further, it is also possible to use a liquid crystal display (LCD) or a fluorescent display tube (VFD) to form the intermediate image G'. However, the laser scanning type is desirable for displaying the large virtual image G with high brightness.

In this regard, if a liquid crystal display (LCD) or a fluorescent display tube (VFD) were used, non-image segments included in the display area to which the virtual image G is displayed would be irradiated even slightly, and it would be difficult to completely prevent the non-image segments from being irradiated. As a result, the visibility of the forward landscape of the vehicle 301 viewable through the non-image segments might degrade. In contrast, according to the laser scanning type, it is possible to completely prevent the non-image segments of the virtual image G in the display area from being irradiated by turning off the laser light sources 201R, 201G, and 201B. Thus, it is possible to avoid degradation of the visibility of the forward landscape of the vehicle 301 through the non-image segments otherwise being degraded due to light emitted from the HUD 200, and it is possible to further improve the visibility of the forward landscape.

Further, for a case where the HUD 200 gradually increases the brightness of an alarm image for, for example, alarming the driver, the HUD 200 is to perform a display control process to gradually increase the brightness of the alarm image from among various images that are displayed. Also for the case of performing the display control process to increase the brightness of a partial image, the laser scanning type is desirable. If a liquid crystal display (LCD) or a fluorescent display tube (VFD) were used, also the brightness of images other than the displayed alarm image might be increased together. Thus, if a liquid crystal display (LCD) or a fluorescent display tube (VFD) were used, it might be impossible to increase the difference in the brightness between the alarm image and the other images, and thus, it might be impossible to sufficiently obtain the advantageous effect to increase the degree of alarming by gradually increasing the brightness of the alarm image.

The optical scanning apparatus 208 inclines the mirror in the main-scanning direction and in the sub-scanning direction with the use of a known actuator driving system such as a MEMS (Micro Electronic Mechanical Systems), to two-dimensionally deflect (in a raster scanning manner) the laser light that is incident on the mirror. Controlling the driving of the mirror is in synchronization with the light emission timing of the laser light sources 201R, 201G, and 201B. Note that the optical scanning apparatus 208 is not limited to having the above-described configuration. For example, an optical scanning apparatus using a mirror system including two mirrors that are oscillated or rotated about two mutually orthogonal axes may be used instead.

Figure 5:
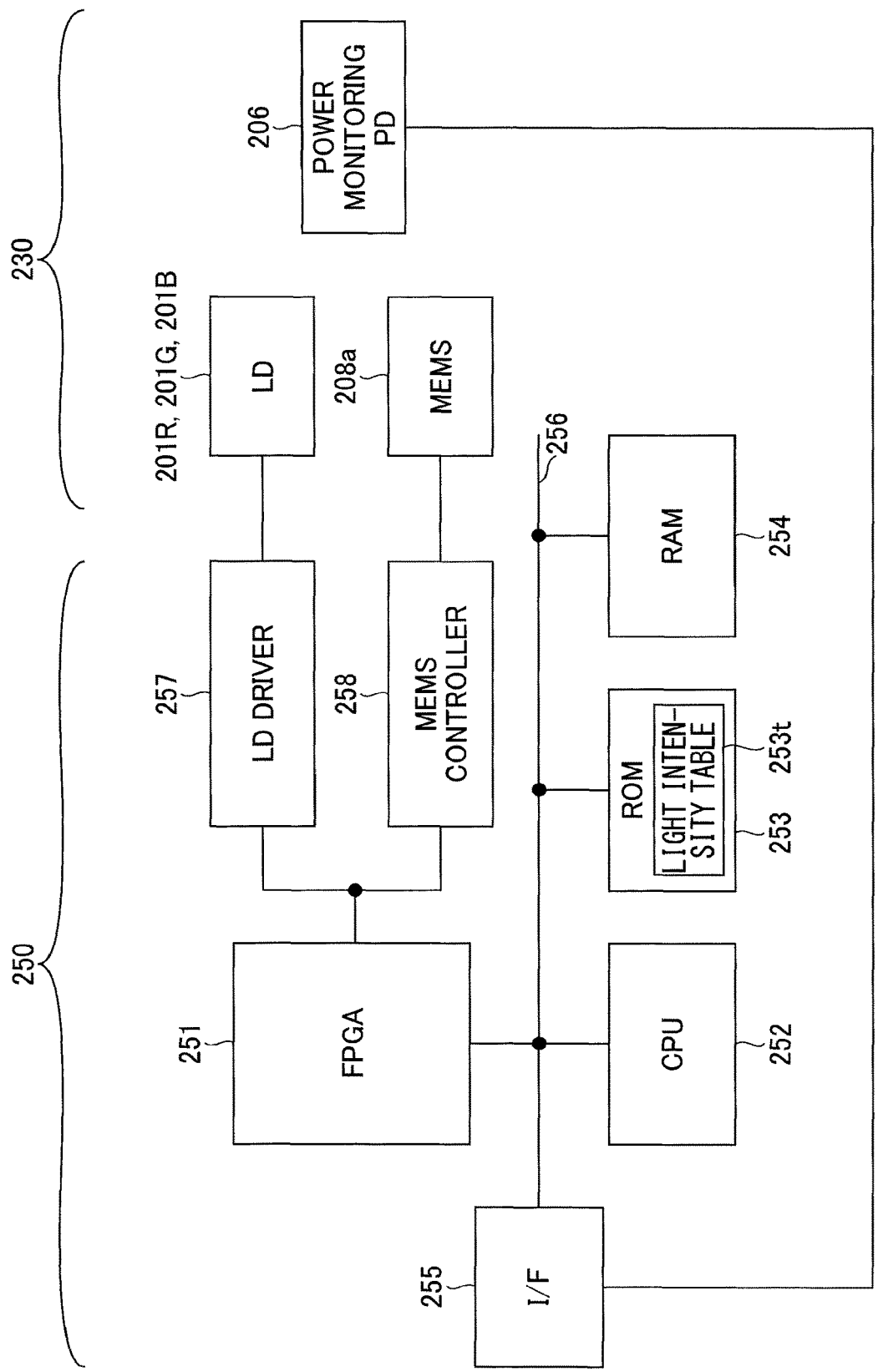
FIG. 5 is a block diagram illustrating an internal configuration example of a control system 250 of the automotive HUD 200 of FIG. 2.

FIG. 5 is a block diagram illustrating an internal configuration example of the control system 250 of the HUD 200 of FIG. 2. As illustrated in FIG. 5, the control system 250 of the HUD 200 includes a FPGA (Field Programmable Gate Array) 251, a CPU (Central Processing Unit) 252, a ROM (Read-Only Memory) 253, a RAM (Random Access Memory) 254, an interface (hereinafter, referred to as I/F) 255, a bus line 256, a LD driver 257, and a MEMS controller 258.

The FPGA 251 uses the LD driver 257 to control the laser light sources 201R, 201G, and 201B of the light source unit 220, and uses the MEMS controller 258 to control scanning operation of the MEMS 208a of the optical scanning apparatus 208. The LD driver 257 performs pulse modulation such as PWM (Pulse-Width Modulation), PAM (Pulse-Amplitude Modulation), or PFM (Pulse-Frequency Modulation), to drive the laser light sources 201R, 201G, and 201B for each pixel of the display image in a time-sharing manner.

The CPU 252 controls various functions of the HUD 200. The ROM 253 stores various programs such as an image processing program for the CPU 252 to control the various functions of the HUD 200. The RAM 254 is used as a work area of the CPU 252.

The I/F 255 is an interface for communication with an external controller or the like, and is connected with, for example, a vehicle navigation apparatus 400, a various-sensor apparatus 500, and so forth via a CAN (Controller Area Network) of the vehicle 301. To the I/F 255, also the forward shooting camera 110 is connected. The forward shooting camera 110 takes a picture of a forward view including the display information of the HUD 200 displayed on the windshield 302 and the background of the display information through the windshield 302. Further, to the I/F 255, also the environment light sensor 150 that detects lightness (or illuminance) and chromaticity of the environment light is connected.

The control system 250 performs a light intensity table updating process (see FIGS. 7A and 14A) according to the first and second embodiments, as will be described later in detail. Thus, the control system 250 corrects the brightness of a display image displayed by the HUD 200 in such a manner as to maintain white balance.

Figure 6:
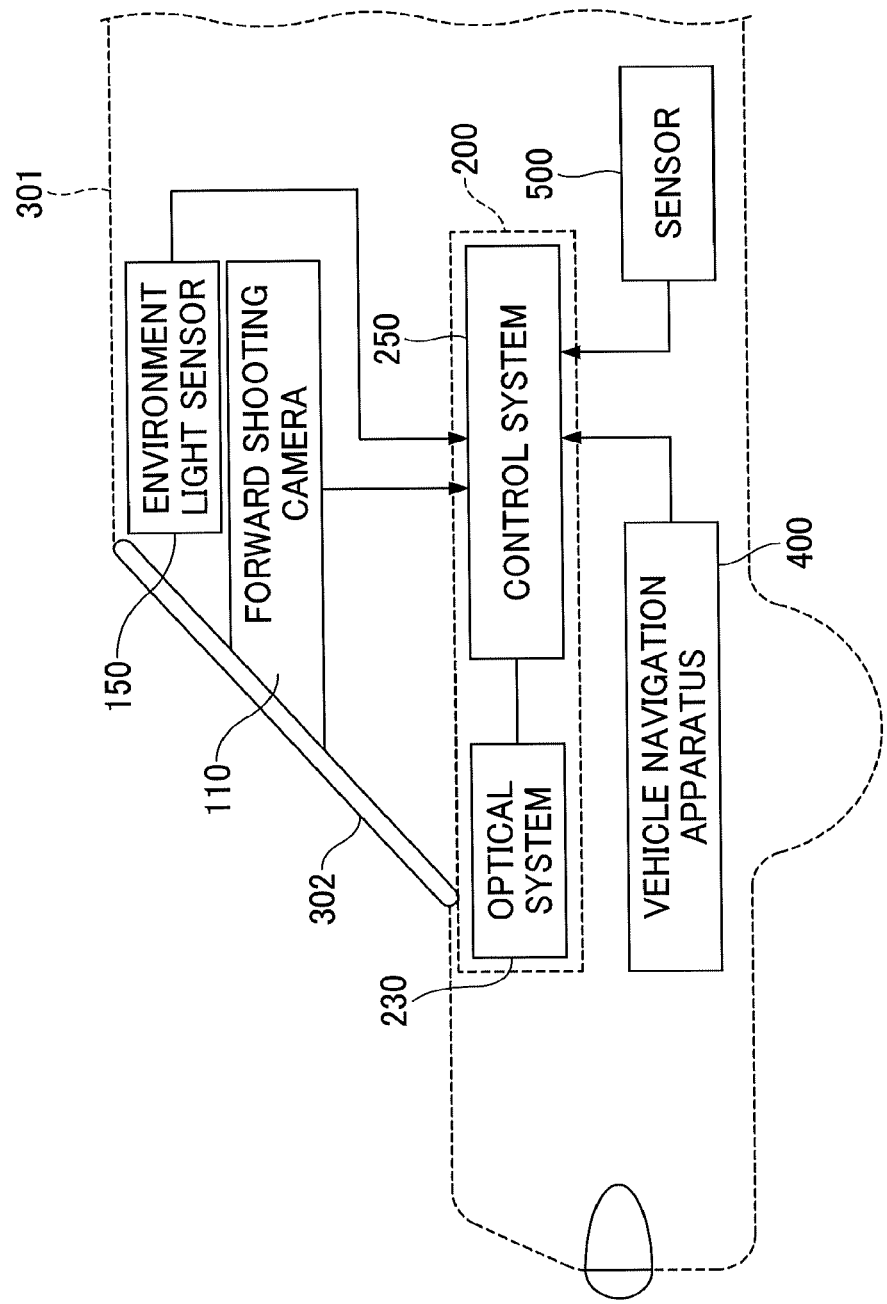
FIG. 6 is a block diagram illustrating a general arrangement example of peripheral apparatuses of the automotive HUD 200 of FIG. 2.

FIG. 6 is a block diagram illustrating a general arrangement of peripheral apparatuses of the HUD 200 of FIG. 2. In each embodiment, as information obtaining units that obtain driver-provided information to be provided to the driver 300 with the virtual image G, the vehicle navigation apparatus 400, the sensor apparatus 500, and so forth are installed. The HUD 200 mainly includes the optical system 230 that is one example of an image light projection unit and the control system 250 that is one example of a display control unit. The HUD 200 and the various peripheral apparatuses that include the above-mentioned information obtaining units are included in an on-vehicle system installed in the vehicle 301.

As the vehicle navigation apparatus 400 according to the present embodiment, a known vehicle navigation apparatus installed in an automobile or the like can be extensively used. The vehicle navigation apparatus 400 outputs information to generate a route navigation image to be displayed as the virtual image G; the information is input to the control system 250. The route navigation image includes, for example, as illustrated in FIG. 1, images that indicate information such as the number of lanes (travelling lanes) of the road on which the vehicle 301 is traveling; the distance to the position at which the next course change (turning right, turning left, entering a branch route, or the like) will be performed; the direction in which the course change will be performed, and so forth. These types of information are input to the control system 250 from the vehicle navigation apparatus 400. As a result, under the control of the control system 250, the HUD 200 displays the information as follows. That is, the route navigation images such as a travelling lane image 711, a vehicular gap image 712, a course instruction image 721, a remaining distance image 722, an intersection (or the like) name image 723, and so forth are displayed in an upper image display area A.

Further, according to the image example illustrated in FIG. 1, the HUD 200 displays, as the virtual image G, images that indicate road-specific information (the road name, the speed limit, and so forth) in a lower image display area B. Also the road-specific information is input to the control system 250 from the vehicle navigation apparatus 400. As a result, the control system 250 displays, with the use of the HUD 200, a road name image 701, a speed limit image 702, a no-passing indication image 703, and so forth corresponding to the road-specific information in the lower image display area B.

The sensor sensor apparatus 500 of FIG. 6 includes one or more sensors for detecting various types of information that indicate the behavior of the vehicle 301, the state of the vehicle 301, the surrounding conditions of the vehicle 301, and so forth. From the sensor apparatus 500, sensing information to be used to generate images to be displayed as the virtual image G is output; the sensing information is input to the control system 250. For example, according to the image example illustrated in FIG. 1, the HUD 200 displays a vehicle speed image 704 (a character image "83 km/h" in the example of FIG. 1) that indicates the speed of the vehicle 301 in the lower image display area B. That is, vehicle speed information that is included in CAN information of the vehicle 301 is input to the control system 250 from the sensor apparatus 500; under the control of the control system 250, the HUD 200 displays the character image indicating the vehicle speed in the lower image display area B as the virtual image G.

As sensors included in the sensor apparatus 500, in addition to the sensor to detect the speed of the vehicle 301, the following sensors can be cited.

(1) a laser radar apparatus or a photographing apparatus for detecting the distances to other vehicles, pedestrians, and constructions (guardrails, telegraph poles, and so forth) in the surroundings (forward, sideward, and backward) of the vehicle 301, and sensors for detecting the vehicle surrounding information (the ambient temperature, the lightness outside, the weather, and so forth)

(2) sensors for detecting driving operations of the driver 300 (a braking operation, the accelerator position, and so forth)

(3) a sensor for detecting the remaining fuel amount in the fuel tank of the vehicle 301

(4) sensors for detecting states of various on-vehicle apparatuses such as the engine, the battery, and so forth As a result of the sensor apparatus 500 including these sensors detecting information and sending the information to the HUD 200, the HUD 200 can provide the information to the driver 300 in the form of the virtual image G.

Next, the virtual image G displayed by the HUD 200 will be described. In the HUD 200 according to each embodiment, the driver-provided information to be provided to the driver 300 by the virtual image G can include any information as long as the information is useful for the driver 300. According to each embodiment, the driver-provided information to be provided to the driver is generally classified into passive information and active information.

The passive information is information that is passively recognized by the driver 300 at a time when predetermined information provision conditions are satisfied. Therefore, information that is provided to the driver 300 at a set time of the HUD 200 is included in the passive information. Information such that a time at which the information is provided has a fixed relationship with the contents of the information is included in the passive information.

As the passive information, for example, information concerning safety while driving, route navigation information, and so forth can be cited. As the information concerning safety while driving, information (the vehicular gap image 712) that indicates the vehicular gap between the vehicle 301 and the preceding vehicle, emergency information concerning driving (alarm information such as emergency operation instruction information that gives instruction to the driver to perform an emergency operation; attention attracting information; or the like), and so forth can be cited. The route navigation information is information of route guidance for a previously-set destination, and can be the same as information that is provided to a driver by a known vehicle navigation apparatus.

As the route navigation information, travelling lane instruction information (the travelling lane image 711) for giving instruction for the travelling lane to travel at an immediate intersection; course change instruction information for giving an instruction for a course change operation at the intersection or the branch point of a next course change from the straight-ahead direction; and so forth can be cited. As the course change instruction information, course instruction information (the course instruction image 721) to give an instruction for a course to select at the intersection or the like; information (the remaining distance image 722) indicating the remaining distance up to the intersection or the like of the course change; information (the intersection (or the like) name image 723) indicating the name of the intersection or the like; and so forth can be cited.

The active information is information to be actively recognized by the driver 300 at a time that is determined by the driver 300 himself or herself. The active information is such that it is sufficient for the active information to be provided to the driver 300 at a time desired by the driver 300. For example, information such that a time at which the information is provided has little or no relationship with the contents of the information is included in the active information.

The active information is information that is provided at a time desired by the driver 300, and therefore, is information that is displayed continuously for a rather long time or is displayed continuously at all times. For example, the road-specific information for the road on which the vehicle 301 is traveling, the vehicle speed information (the vehicle speed image 704) of the vehicle 301, the current time information, and so forth can be cited. As the road-specific information, information concerning the road and useful for the driver 300 such as information (the road name image 701) indicating the name of the road; information (the speed limit image 702 or the no-passing indication image 703) indicating regulation contents concerning the road such as a speed limit; and so forth can be cited for example.

According to each embodiment, the thus generally classified passive information and active information are displayed in the respective display areas where the virtual images G can be displayed. Actually, according to each embodiment, as areas in which the HUD 200 displays the virtual images, two display areas arranged vertically are set. In the upper image display area A of these two display areas, mainly passive information images corresponding to the passive information are displayed. In the lower image display area B of these two display areas, mainly active information images corresponding to the active information are displayed. Note that, for a case where some of the active information images are displayed in the upper image display area A, these active information images are displayed in such a manner that the visibility of the passive information images displayed in the upper image display area A has priority over the visibility of these active information images.

Further, according to each embodiment, as the virtual image G displayed by the HUD 200, a stereoscopic image that is expressed with the use of a stereoscopic approach is used. Actually, as the vehicular gap image 712 and the travelling lane image 711 displayed in the upper image display area A, a perspective image that is expressed with the use of perspective is used.

In more detail, the five horizontal lines included in the vehicular gap image 712 are displayed in such a manner that the higher horizontal line is shorter. Thus, the vehicular gap image 712 is expressed as a perspective image directed toward a single vanishing point according to a perspective drawing method. Especially, according to each embodiment, the vehicular gap image 712 is formed in such a manner that the vanishing point can be determined near the gazing point of the driver 300. As a result, the driver 300 can easily perceive the sense of depth of the vehicular gap image 712. In addition, according to each embodiment, the vehicular gap image 712 as the perspective image is displayed in such a manner that the higher horizontal line is narrower or the brightness of the higher horizontal line is lower. As a result, the driver 300 can further easily perceive the sense of depth of the vehicular gap image 712.

Thus, mainly the hardware configuration example of the HUD 200 used in the first and second embodiments has been described. In each of the embodiments, the following hardware devices are used.

(1) In the first embodiment, light intensity tables 253t in the ROM 253 and the environment light sensor 150 (that may be a sensor that detects only illuminance) are used. Therefore, there is no need to provide the forward shooting camera 110.

(2) In the second embodiment, the light intensity tables 253t in the ROM 253 and the forward shooting camera 110 are used. Therefore, there is no need to provide the environment light sensor 150.

First Embodiment

Figure 7A:
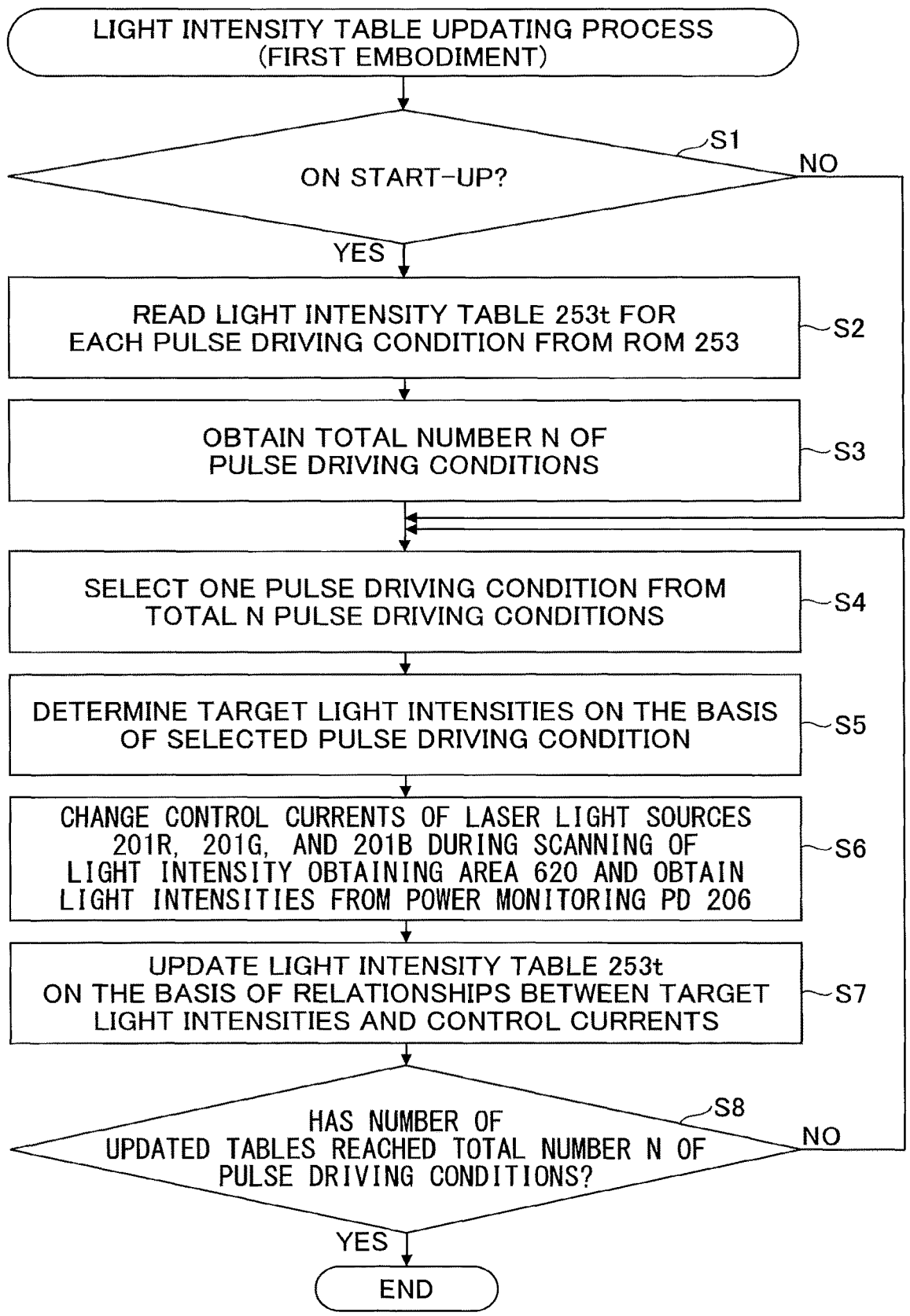
FIG. 7A is a flowchart illustrating an example of a light intensity table updating process implemented by the control system 250 according to a first embodiment.
Figure 8:
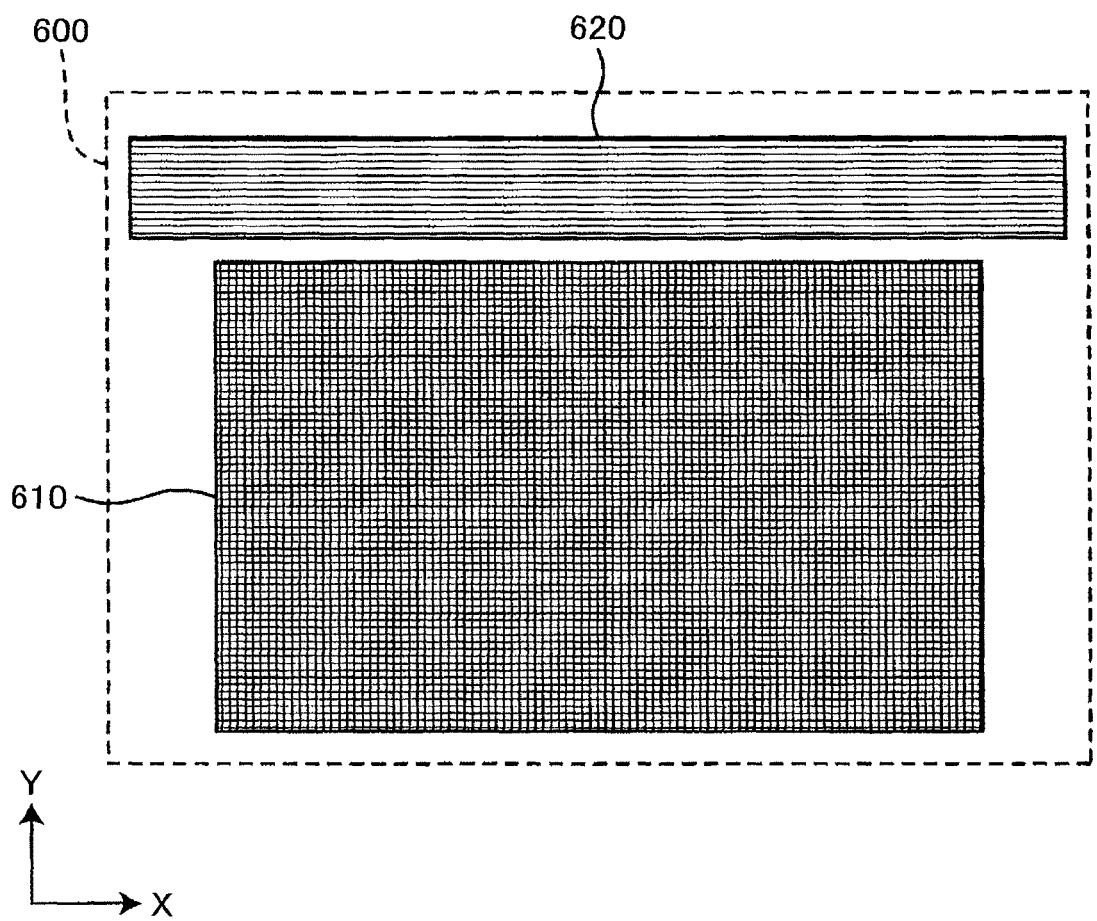
FIG. 8 illustrates one example of a scanning zone 600 of an optical scanning apparatus 208 of FIG. 3.

Hereinafter, a method implemented in the HUD 200 of FIG. 2 for displaying a display image with appropriate brightness without color shift, even when a sharp outside light change or a temperature change occurs, will be described. Below, the present embodiment will be described with reference to the drawings. FIG. 7A is a flowchart illustrating one example of a light intensity table updating process implemented by the control system 250 according to the first embodiment. FIG. 8 illustrates one example of a scanning zone 600 of the optical scanning apparatus 208 of FIG. 3.

According to the present embodiment, in order for the viewer such as the driver 300 under the conditions where the outside light changes between the daytime and the nighttime to easily view the display image, the environment light sensor 150 of FIG. 6 is used to adjust the brightness of the display image, for example. In this case, in order to broaden the dynamic range of the brightness of the display image, the display image with low brightness is implemented by pulse driving of the laser light sources 201R, 201G, and 201B. Hereinafter, a setting condition for setting the pulse widths, the pulse driving frequencies, or the like of the laser light sources 201R, 201G, and 201B to values suitable for the illuminance or lightness of the outside light will be referred to as a "pulse driving condition". For example, in the nighttime where the illuminance or lightness of the outside light is low, by detecting the illuminance or lightness of the outside light with the environment light sensor 150, the control system 250 selects a pulse driving condition to reduce the brightness of the display image in comparison to the daytime where the illuminance or lightness of the outside light is high. As a result, the viewer such as the driver 300 can easily view the display image. The light intensity tables 253t for respective pulse driving conditions are previously stored in the ROM 253, for example.

At a time of pulse driving of the laser light sources 201R, 201G, and 201B, due to differences in start-up characteristics of the respective laser light sources, white balance of the display image may be disrupted. In order to avoid the disruption, the present embodiment corrects the light intensities in the display image. For this purpose, the present embodiment uses light intensity tables 253t that indicate relationships for each pulse driving condition between control currents to be provided to the respective laser light sources 201R, 2016, and 201B and gradations. In addition, the present embodiment updates the light intensity tables 253t at an appropriate timing according to the light intensity table updating process of FIG. 7A that will be described later. Further, white balance in the display image may be disrupted also due to differences in temperature characteristics among the laser light sources 201R, 201G, and 201B. Therefore, during the use of the HUD 200, color shift may occur in the display image. For avoiding color shift, according to the present embodiment, in the light intensity table updating process of FIG. 7A, during displaying of the display image, light intensity tables 253t are updated, for example, cyclically.

FIG. 8 illustrates a scanning zone 600 scanned by the optical scanning apparatus 208 of FIG. 3 during displaying of one frame of the display image. In FIG. 8, the X direction is a main-scanning direction and the Y direction is a sub-scanning direction. According to the present embodiment, in order to make it possible to update the light intensity tables 253t during displaying of the display image, a light intensity obtaining zone 620 for obtaining the light intensity of each of the laser light sources is provided outside an effective image display zone 610 for a viewer to view the display image in the scanning zone 600. In the light intensity table updating process of FIG. 7A, by using the light intensity obtaining zone 620 to obtain the light intensity of each laser light source on a real time basis, it is possible to appropriately update the light intensity tables 253t and display the display image with high precision.

Note that, in FIG. 8, the light intensity obtaining zone 620 is in a Y direction relative to, i.e., above the effective image display zone 610. However, this is merely an example, and, in another example, the light intensity obtaining zone 620 may be in the opposite direction of the Y direction relative to, i.e., below the effective image display zone 610, or may be in a X direction relative to the effective image display zone 610. Further, in order for the viewer to be able to view the display image in the effective image display zone 610 but not be able to view the light intensity obtaining zone 620, the projected light L to scan the light intensity obtaining zone 620 may be blocked. Blocking of the projected light L with which the light intensity obtaining zone 620 is scanned can be implemented by appropriately setting an optical system on the light path of FIG. 3. For example, as illustrated in FIG. 3, on the light path of the projected light L in the optical system 230, a light blocking member 212 may be installed. When the projected light L scans the light intensity obtaining zone 620, the light blocking member 212 blocks the projected light L to prevent the light intensity obtaining zone 620 from being displayed on the windshield 302.

Figure 9:
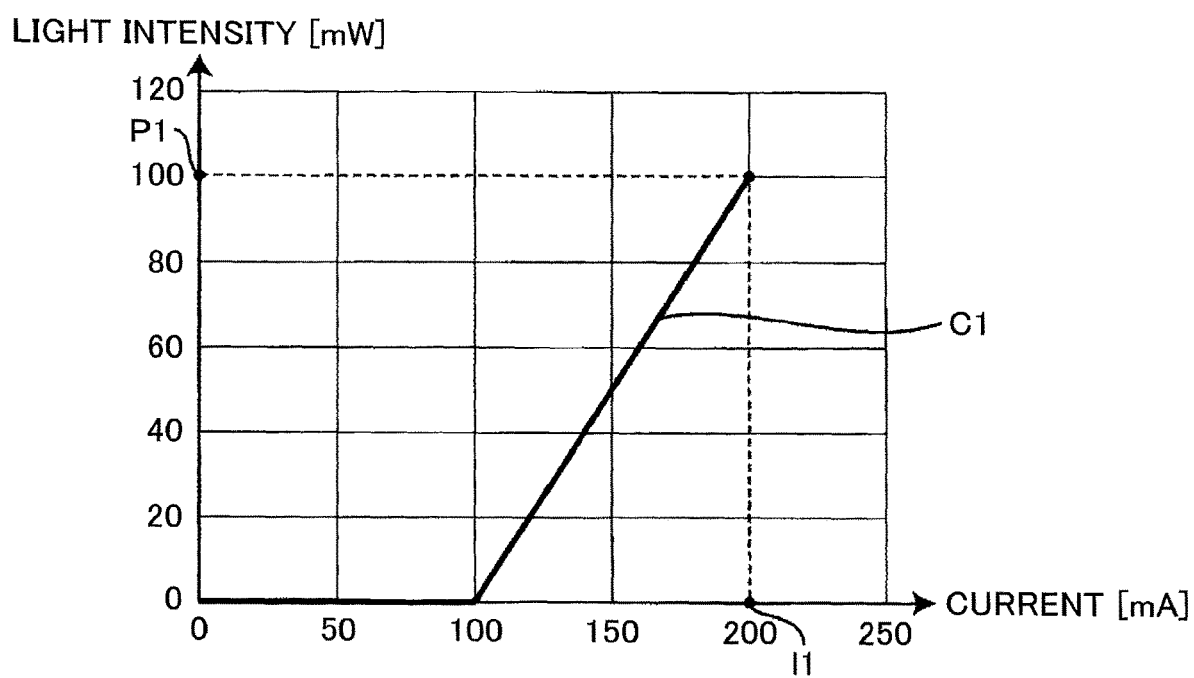
FIG. 9 illustrates one example of relationships between light intensities and control currents obtained in the light intensity table updating process of FIG. 7A.

Below, the light intensity table updating process, for which FIG. 7A illustrates the flowchart, will be described with the use of FIGS. 7A, 8, and 9. FIG. 9 illustrates an example of relationships between the light intensities and the control currents obtained in the light intensity table updating process of FIG. 7A. The light intensity table updating process of FIG. 7A is performed by the control system 250 of FIG. 5 at a time when the HUD 200 is started, and, after the HUD 200 is started, during displaying of the display image. Note that a time when the HUD 200 is started may be, for example, a time when the ignition of the vehicle 301 is turned on.

In step S1 of FIG. 7A, the control system 250 determines whether the current time is a time to start the process, for example, a time to start the HUD 200. In response to having determined that the current time is a time to start the HUD 200 (YES in step S1), the control system 250 reads from the ROM 253 the light intensity table 253t for each pulse driving condition (step S2). The ROM 253 previously stores for each pulse driving condition the light intensity table 253t that includes data of initial values at a time of starting up the respective laser light sources. By using the light intensity table 253t that includes the data of the initial value at a time of starting up the respective laser light sources and that has been read in step S2, it is possible to shorten a time to correct the brightness and color shift at a time of starting up.

Next, on the basis of the light intensity table 253t for each pulse driving condition having been read from the ROM 253, the control system 250 obtains the total number N of the pulse driving conditions (S3), and proceeds to step S4. In response to having determined in step S1 that the present time is not a time to start the HUD 200, i.e., the present time is not a time to start the process (NO in step S1), the control system 250 proceeds to step S4.

In step S4, the control system 250 selects one pulse driving condition out of the total N pulse driving conditions (step S4). Next, on the basis of the selected pulse driving condition, the control system 250 determines target light intensities (step S5). The target light intensities are light intensities that are implemented by the control currents that implement the greatest gradations under the selected pulse driving condition. For example, the control system 250 determines the target light intensities according to the duty ratios in the pulse driving condition of PWM.

Next, the control system 250 gradually changes the respective control currents of the laser light sources 201R, 201G, and 201B during scanning of the light intensity obtaining zone 620 of FIG. 8, and obtains light intensities detected by the power monitoring PD 206 during the scanning period (step S6). In step S6, the CPU 252 in the control system 250 of FIG. 5 sets up the FPGA 251 and the LD driver 257 in such a manner that the FPGA 251 and the LD driver 257 perform operations based on the selected pulse driving condition during the scanning period for the light intensity obtaining zone 620. The FPGA 251 synchronizes between the LD driver 257 and the MEMS controller 258. The LD driver 257 supplies the control currents to the laser light sources 201R, 201G, and 201B such that the laser light sources 201R, 201G, and 201B perform pulse modulation on laser light according to a pulse driving condition that is switched with another pulse driving condition between the scanning period for the effective image display zone 610 and the scanning period for the light intensity obtaining zone 620 of FIG. 8.

In FIG. 9, the target light intensity P1 is set in step S5 to be, for example, a target light intensity P1=100 mW. In step S6, the control system 250 gradually increases the control current from the laser oscillation threshold near 100 mA, and simultaneously, detects the light intensities with the power monitoring PD 206. The control system 250 obtains a curve C1 representing a characteristic indicating relationships between the light intensities and the current values of the control currents until the light intensity reaches the target light intensity P1 as illustrated in FIG. 9 while increasing the control current until the detected light intensity reaches the target light intensity P1. In the example of FIG. 9, the light intensity reaches the target light intensity P1 at the control current I1=200 mA.

As will be described later in detail, the process of step S6 described above is performed for the light intensity obtaining zone 620 for each scanning period at one or more frames. Further, according to the present embodiment, the control system 250 performs the process of step S6 of FIG. 7A for the respective laser light sources 201R, 201G, and 201B in sequence.

Next, on the basis of the relationships obtained in step S6 between the light intensities and the control currents up to the target light intensities, the control system 250 updates the corresponding light intensity table 253t (step S7). The light intensity table 253t updated in step S7 is the light intensity table 253t corresponding to the pulse driving condition selected in step S4. The update of the light intensity table 253t is performed in such a manner that, for each gradation, the light intensity is associated with the control current with the use of FIGS. 11-13 as will be described later in detail. The updated light intensity table 253t is stored in the RAM 254, for example.

Next, the control system 250 determines whether the number of updated light intensity tables has reached the total number N of the pulse driving conditions (step S8). In response to the control system 250 having determined that the number of updated light intensity tables has not reached the total number N of the pulse driving conditions (NO in step S8), the control system 250 returns to step S4, selects an unupdated pulse driving condition, and repeats the process starting from step S5. In response to the control system 250 having determined that the number of updated light intensity tables has reached the total number N of the pulse driving conditions (YES in step S8), the control system 250 ends the process. According to the present embodiment, the above-described process is repeated in a predetermined cycle.

Figure 7B:
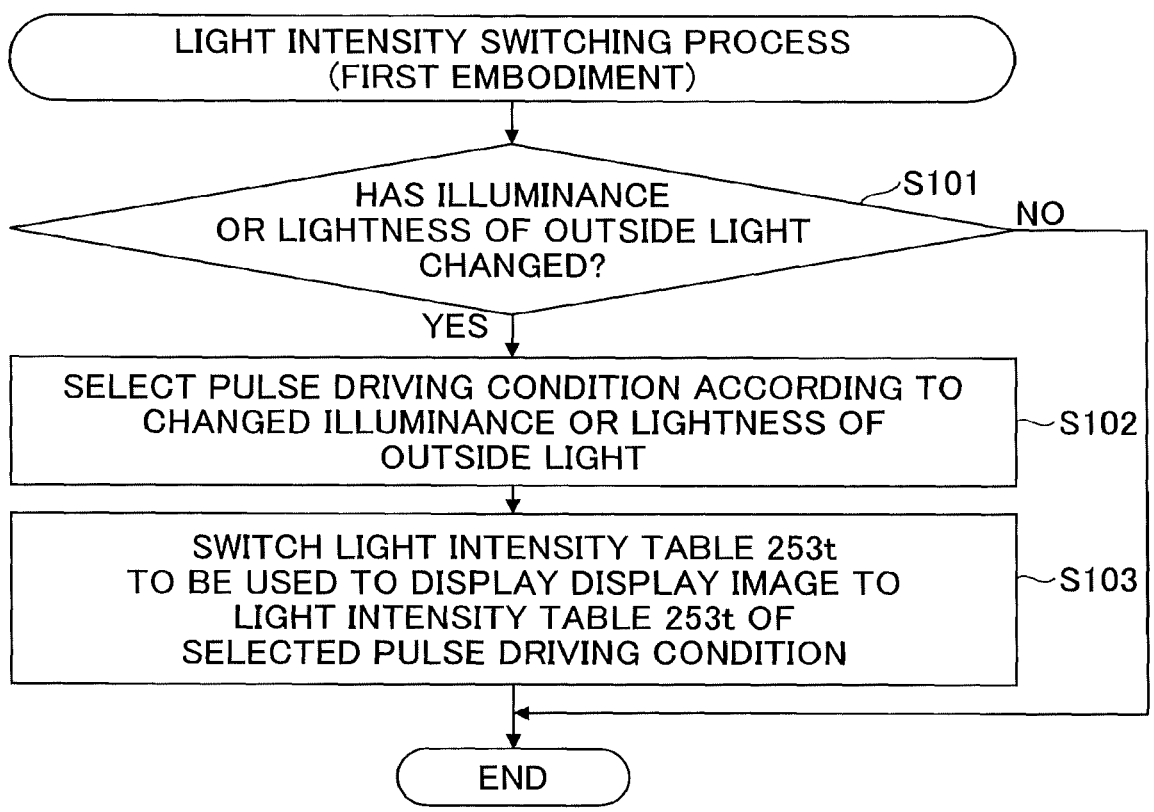
FIG. 7B is a flowchart illustrating an example of a light intensity table switching process implemented by the control system 250 according to the first embodiment.

FIG. 7B is a flowchart illustrating an example of the light intensity table switching process implemented by the control system 250 according to the first embodiment. The process of FIG. 7B is performed by the control system 250, for each frame of the display image, for example.

In step S101, the control system 250 determines, according to a detection result of the lightness (or illuminance) of the environment light (outside light) surrounding the display image from the environment light sensor 150, whether the lightness (or illuminance) of the outside light has changed. The determination in step S101 can be implemented as, for example, a determination as to whether the detection value of the environment light sensor 150 has changed by an amount greater than or equal to a predetermined amount.

In response to a determination result NO in step S101, the control system 250 ends the process. In response to a determination result YES in step S101, the control system proceeds to step S102.

In step S102, the control system 250 selects the pulse driving condition corresponding to the changed lightness (or illuminance) of the outside light. Next, in step S103, the control system 250 switches the light intensity table 253*t* to be used to display the display image to the light intensity table 253*t* corresponding to the pulse driving condition selected in step S102.

Thereafter, the control system 250 displays the display image for the frame while controlling the control currents for the laser light sources 201R, 201G, and 201B according to the switched light intensity table 253*t*.

Thus, fluctuations in the response characteristics of the laser light sources 201R, 201G, and 201B and so forth caused by temperature changes are corrected at appropriate timing with the use of the light intensity tables 253*t*. As a result, updates are implemented to obtain states where white balance can be maintained. As a result, when the pulse driving condition is switched due to a change in the outside light, the display image can be displayed with high preciseness at appropriate brightness without color shift immediately. The control system 250 controls the control currents with the use of the light intensity table 253*t* where the light intensities are associated with the respective control currents of the laser light sources 201R, 201G, and 201B for respective gradations, and thus, can display the display image having the desired gradations and colors while maintaining white balance.

Note that the light intensity table updating process of FIG. 7A may be performed in response to the user of the HUD 200 performing a predetermined operation.

According to the present embodiment, in response to a determination in step S8 of FIG. 7A that the number of updated tables has reached the total number N of pulse driving conditions, thereafter the updated light intensity tables 253*t* are used to display the display image. However, another manner may be used; for example, the display image may be displayed at appropriate timing before the total number N is reached, with the use of some of the light intensity tables 253*t* having been already updated.

Figure 10:
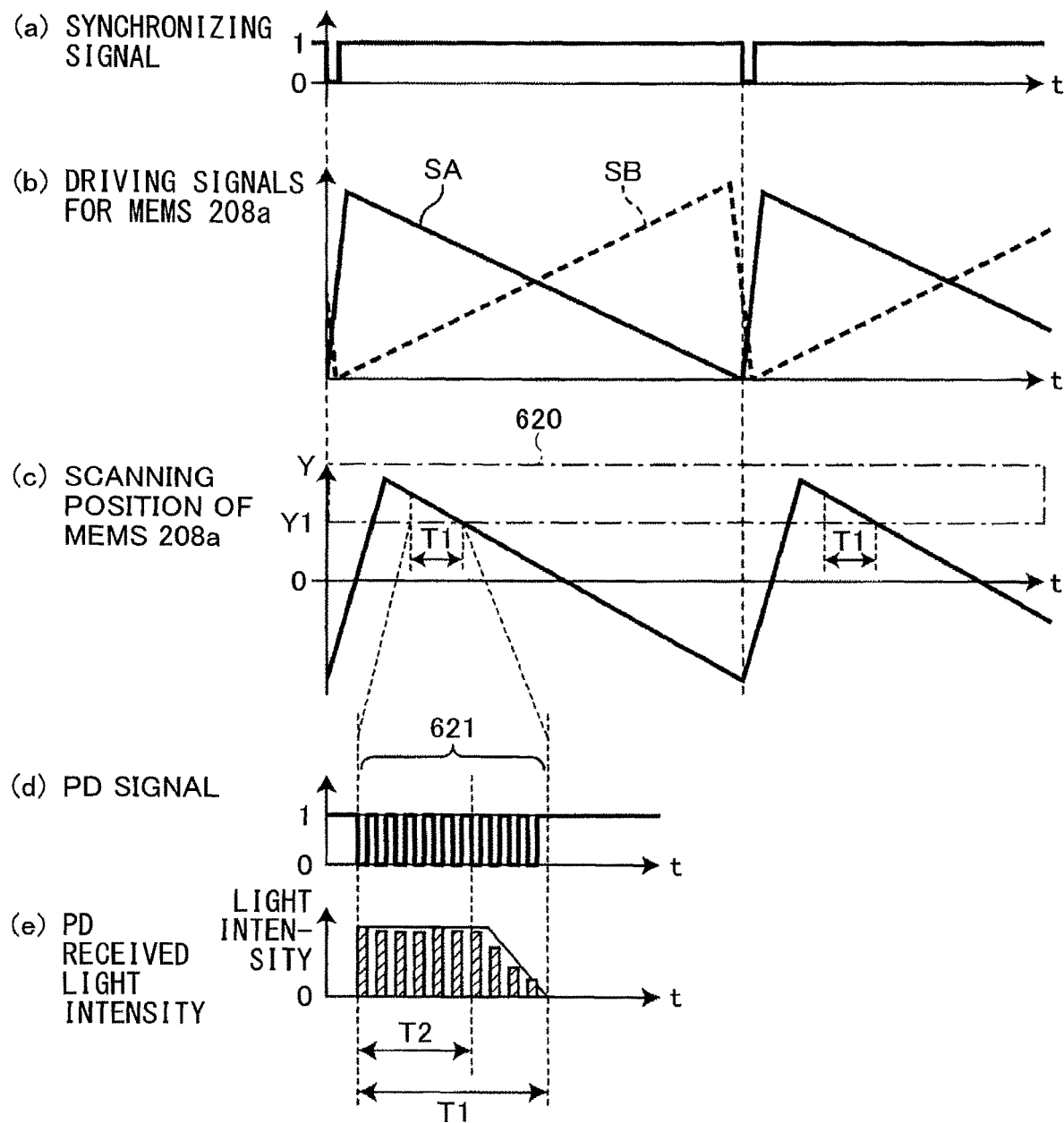
FIG. 10 is one example of timing charts of respective signals in the light intensity table updating process of FIG. 7A.

Hereinafter, an operation timing of step S6 of FIG. 7A will be described with the use of FIG. 10. FIG. 10 is a timing chart of each signal for the light intensity table update process of FIG. 7A. The timing chart (a) illustrates a timing to generate a synchronizing signal in the control system 250. The timing chart (b) illustrates a timing to generate driving signals SA and SB for various elements of the control system 250 based on the synchronizing signal of the timing (a). The timing chart (c) illustrates a change in the inclination state of a mirror according to a scanning operation of the MEMS 208*a* based on the driving signal SA. The timing chart (d) illustrates a timing to generate a PD signal during a period T1 in the timing chart (c). The timing chart (e) illustrates a change in the received light intensity of the power monitoring PD 206 based on the PD signal of the timing chart (d).

The synchronizing signal of the timing chart (a) is a signal that synchronizes the various elements of the control system 250 of FIG. 5 for each frame of the display image, and, as illustrated in the timing chart (b), sets the timings to generate driving signals SA and SB for the various elements. The driving signal SA of the timing chart (b) is a driving signal to cause the MEMS 208*a* to perform a scanning operation along the sub-scanning directions. As illustrated in the timing chart (c), the scanning position controlled by the MEMS 208*a* changes along the Y directions at frame cycles, and the scanning position Y1 of the projected light L corresponds to the bottom end of the light intensity obtaining zone 620 of FIG. 8.

The PD signal of the timing chart (d) is a signal to control receiving of light by the power monitoring PD 206. The control system 250 captures the received light intensity of the power monitoring PD 206 during the capturing period T2 illustrated in the timing chart (e) while controlling the power monitoring PD 206 so that, during the period T1 of the timing chart (c), the power monitoring PD 206 repeatedly receives light for a number of light reception instances 621 so as to receive light according to the PD signal of the timing chart (d). Thus, the control system 250 obtains, for example, 40 light intensities on the characteristic curve C1 of FIG. 9 during the period T2 in one frame.

In step S6 of FIG. 7A, the control system 250 obtains the light intensities for several frames for each of the laser light sources 201R, 201G, and 201B for each pulse driving condition. During obtaining of the light intensities, the control system 250 displays the display image to the effective image display zone 610 of FIG. 8 by driving the laser light sources 201R, 201G, and 201B under the pulse driving conditions that are set separately from the pulse driving conditions for which the light intensities are obtained. Thus, it is possible to efficiently update the light intensity tables 253*t* during displaying of the display image.

Below, the method for updating the light intensity table 253*t* in step S7 of FIG. 7A will be described with the use of FIGS. 11-13.

Figure 11:
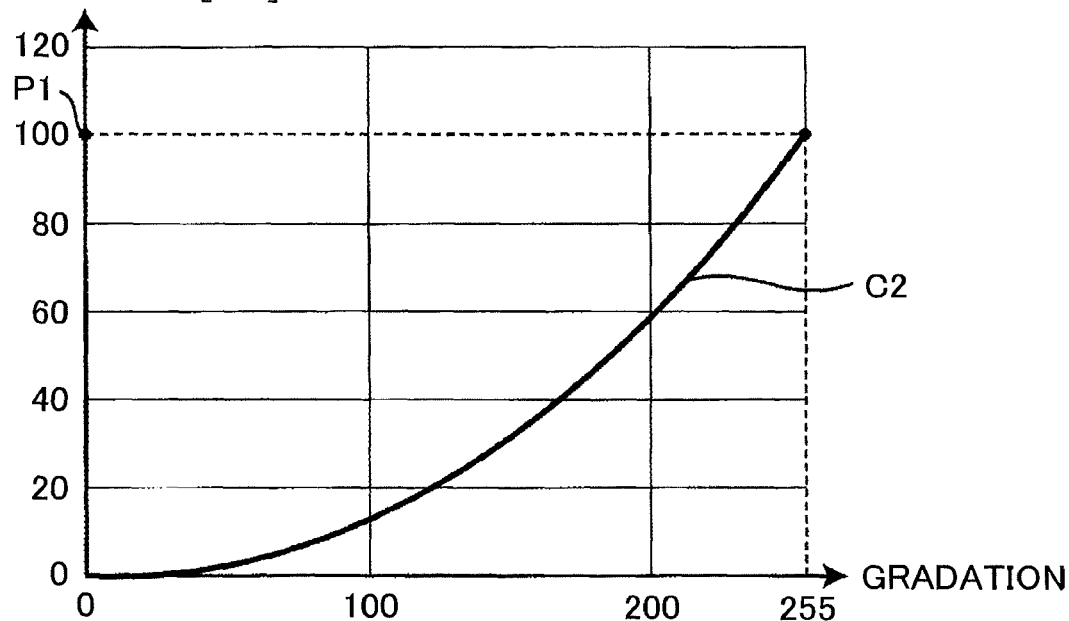
FIG. 11 illustrates an example of relationships between gradations in display images and light intensities concerning the light intensity table updating process of FIG. 7A.

FIG. 11 illustrates one example of relationships between gradations in the display images and the light intensities concerning the light intensity table updating process of FIG. 7A. In order to express the display image with a smooth gray scale, a relational expression between the gradations and the light intensities is expressed not by a straight line but by a curve C2 illustrated in FIG. 11 having a predetermined γ value (an index indicating a ratio between a change in the gradation of the display image and the light intensity). According to the present embodiment, information indicating the curve C2 is previously stored in the ROM 253 as, for example, an operational expression having a correction factor for the γ value or a data table of the light intensities for the respective gradations.

Figure 12:
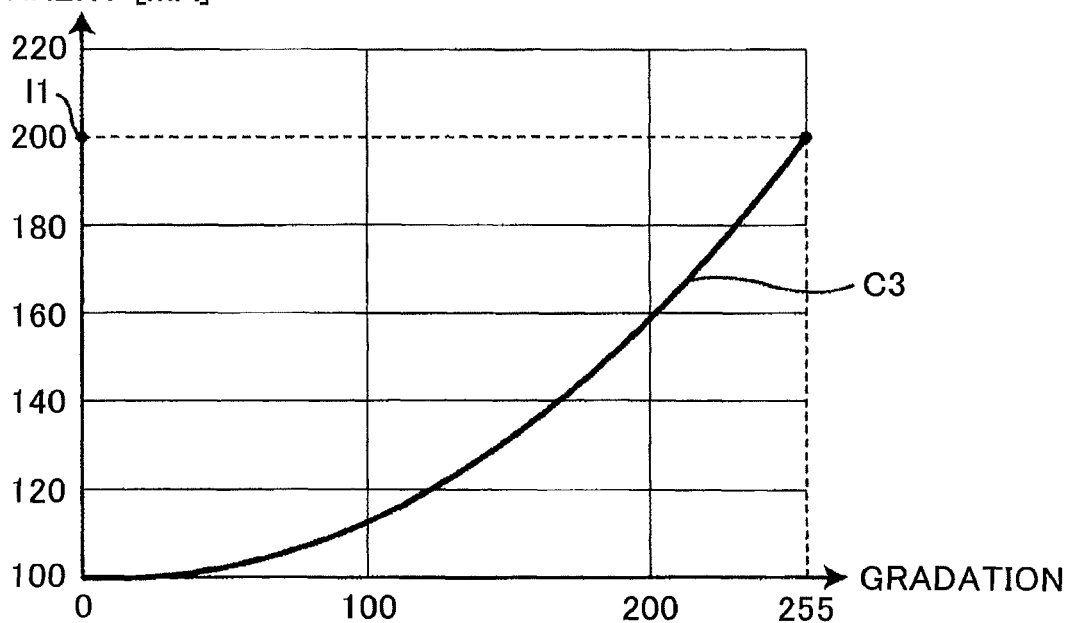
FIG. 12 illustrates an example of relationships between gradations in display images and control currents concerning the light intensity table updating process of FIG. 7A.

FIG. 12 illustrates an example of relationships between the gradations in the display images and the control currents concerning the light intensity table updating process of FIG. 7A. In step S7 of FIG. 7A, the control system 250 newly calculates a relational curve C3 between the gradations and the control currents as illustrated in FIG. 12 on the basis of the characteristic curve C1 of FIG. 9 between the light intensities and the control currents and the information indicating the curve C2 of FIG. 11. According to the present embodiment, information indicating the relational curves C3 is stored as the light intensity tables 253*t*. It is also possible that the information indicating the relational curve C3 is stored as relational expressions indicating the relationships between the gradations or the light intensities for the respective gradations and the control currents.

Figure 13:
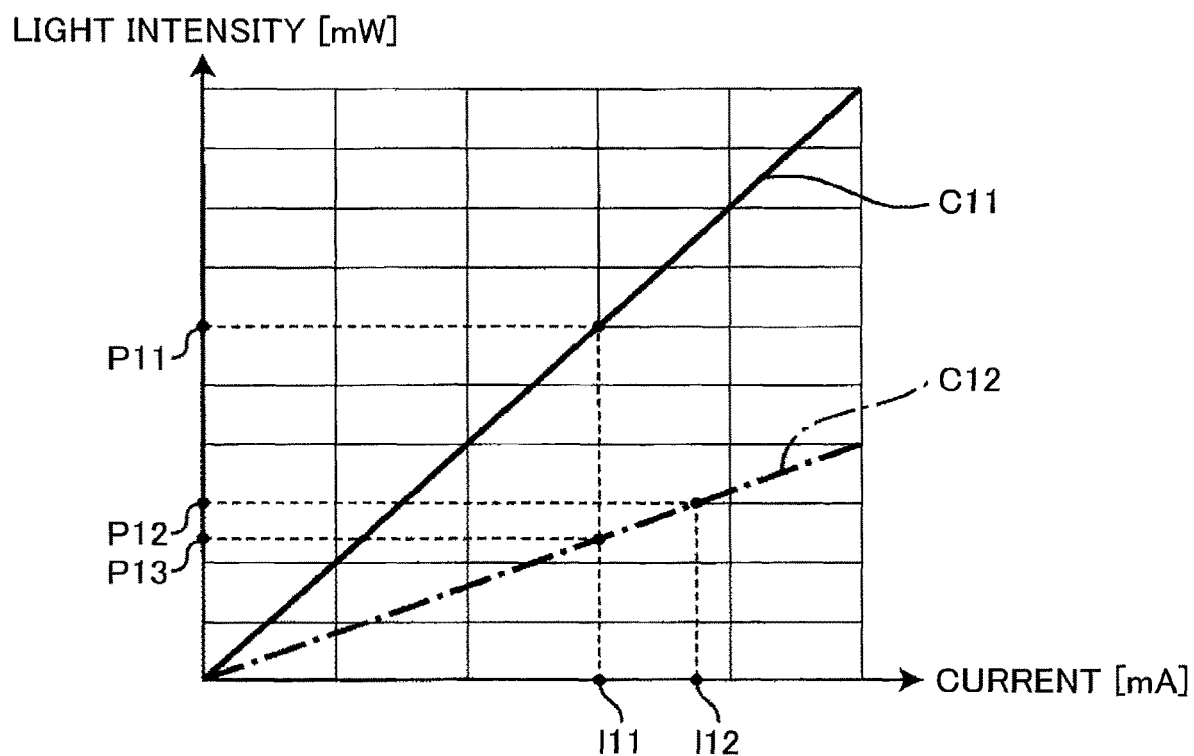
FIG. 13 illustrates an example of relationships between light intensities and control currents in different pulse driving conditions.

FIG. 13 illustrates relationships between the light intensities and the control currents for the different pulse driving conditions. According to the present embodiment, in order to maintain white balance regardless of differences in beam attenuation rates of the respective laser light sources 201R, 201G, and 201B caused by pulse driving operation, the number of light intensity tables 253*t* corresponding to the total number N of the pulse driving conditions are prepared and updated.

In FIG. 13, the characteristic curve C11 illustrates characteristics of the light intensities with respect to the control currents for a case of the pulse driving condition for continuous light emission, i.e., the duty ratio being 1; and the characteristic curve C12 illustrates characteristics of the light intensities with respect to the control currents for a case of the pulse driving condition for the duty ratio being 0.5. Note that a light intensity for a case of pulse driving is measured as an integrated light intensity for a predetermined time period. For the sake of convenience of explanation, hereinafter, FIG. 13 is assumed as illustrating characteristics of the laser light sources 201R.

In FIG. 13, when the control current I11 is supplied to the laser light sources 201R for a continuous light emission case, the light intensity is P11 according to the characteristic curve C11. Accordingly, as a result of supplying the control current I11 to the laser light sources 201R for a case of the duty ratio 0.5, the light intensity P12 would be ideally half the light intensity P11 of the continuous light emission case. However, in a case where the responsiveness of the laser light source 201R is insufficient, a time elapses until the light intensity reaches the desired light intensity in the light emission period, and the integrated light intensity degrades. As a result, in the example of the characteristic curve C12 of FIG. 13, the light intensity P13 is smaller than the light intensity P12 when the control current I11 is supplied to the laser light source 201R.

The responsiveness of each of the laser light sources 201R, 201G, and 201B is unique to the corresponding laser, and depends also on the temperature and the current value. Therefore, if the same control currents were supplied to the respective laser light sources 201R, 201G, and 201B between before and after switching of the pulse driving condition, white balance in the display image might be disrupted. According to the present embodiment, respective light intensity tables 253*t* are prepared for the laser light sources 201R, 2016, and 201B for each pulse driving condition. With the use of the light intensity tables 253*t*, relationships between the control currents and the integrated light intensities are managed separately for each of the laser light sources 201R, 201G, and 201B. In the example of FIG. 13, the control current I12 with which it is possible to obtain the light intensity P12 on the basis of the characteristic curve C12 of the laser light source 201R is previously recorded in the corresponding light intensity table 253*t*. Also for the other laser light sources 201G and 201B, the management is performed in the same way. As a result, it is possible to maintain white balance surely for the pulse driving condition having the duty ratio 0.5.

According to the present embodiment, the above-mentioned light intensity tables 253*t* indicating the relationships between the control currents and the gradations for the respective laser light sources 201R, 201G, and 201B for each pulse driving condition are updated at appropriate timing according to the process described above with reference to FIG. 7A. As a result, even if sharp changes in the outside light and temperature occur, the HUD 200 is capable of displaying the display image with high preciseness while maintaining white balance.

The HUD 200 having the above-described configuration is one example of an image display apparatus that displays a display image. The HUD 200 includes the laser light sources 201R, 201G, and 201B, the optical scanning apparatus 208, the power monitoring PD 206, the ROM 253, and the control system 250. The laser light sources 201R, 201G, and 201B emit light. The optical scanning apparatus 208 scans the predetermined scanning zone 600 with the light from the laser light sources 201R, 201G, and 201B to render the display image. The power monitoring PD 206 detects the light intensities of the light from the laser light sources 201R, 201G, and 201B. The ROM 253 stores the light intensity tables 253*t* indicating relationships between the control currents supplied to the laser light sources 201R, 201G, and 201B and the light intensities. The control system 250 controls the control currents in such a manner that the display image is displayed by the light from the laser light sources 201R, 201G, and 201B, on the basis of the light intensity tables 253*t*. The control system 250 obtains the light intensities detected by the power monitoring PD 206 during scanning of the light intensity obtaining zone 620 outside the display image by the optical scanning apparatus 208, and updates the light intensity tables 253*t* stored in the ROM 253 on the basis of the obtained light intensities.

The HUD 200 updates the light intensity tables 253*t* stored in the ROM 253 on the basis of the light intensities detected by the power monitoring PD 206 during scanning of the light intensity obtaining zone 620. Thus, it is possible to display the display image having various gradations with high preciseness.

Second Embodiment

According to the first embodiment, the light intensity tables 253*t* for all the pulse driving conditions are updated cyclically for example. According to a second embodiment, on the basis of a surrounding environment such as a road, switching of the pulse driving condition is anticipated. Then, before the anticipated switching timing, the light intensity table 253*t* corresponding to the pulse driving condition that would be selected at the anticipated switching timing is updated. Below, with reference FIGS. 14A and 14B, the present embodiment will be described.

Figure 14A:
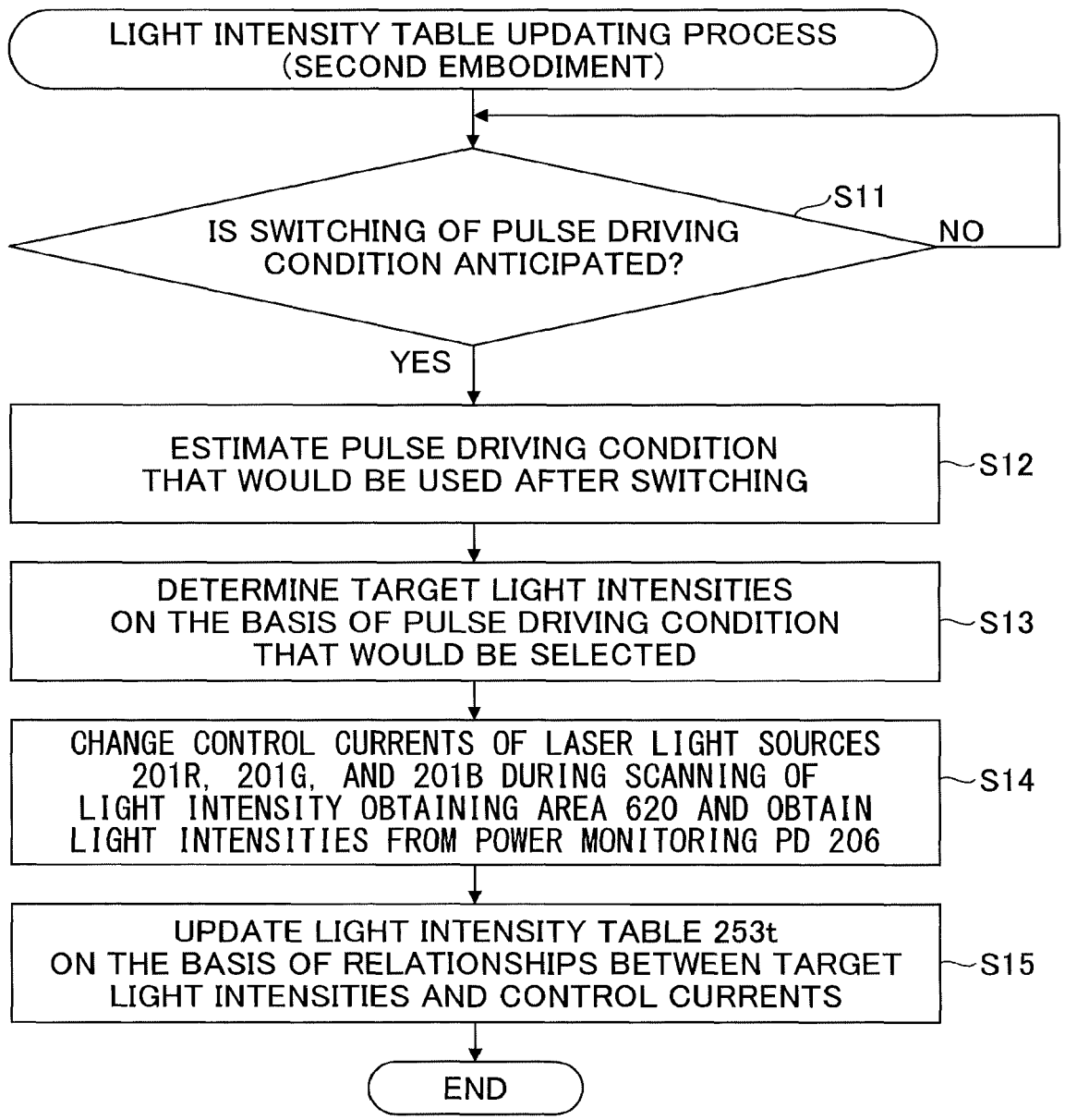
FIG. 14A is a flowchart illustrating an example of a light intensity table updating process implemented by the control system 250 according to a second embodiment.

FIG. 14A is a flowchart illustrating an example of a light intensity table updating process implemented by the control system 250 according to the second embodiment. The HUD 200 according to the present embodiment performs the light intensity table updating process of FIG. 14A and a light intensity table switching process of FIG. 14B instead of the light intensity table updating process of FIG. 7A and the light intensity table switching process of FIG. 7B.

In step S11 of FIG. 14A, the control system 250 determines whether switching of the pulse driving condition is anticipated. For a case where the control system 250 has determined that switching of the pulse driving condition is not anticipated (NO in step S11), the control system 250 repeats the process of step S11 in a predetermined cycle.

The determination in step S11 is implemented on the basis of information that is obtained from various peripheral apparatuses of the HUD 200 of FIG. 6, for example. For example, it can be anticipated that, for example, the vehicle 301 would travel into a tunnel, by obtaining road conditions from the vehicle navigation apparatus 400 of FIG. 6 or by photographing the forward view of the vehicle 301 with the shooting camera 110. In this case, the control system 250 determines in step S11 that switching of the pulse driving condition for reducing the brightness of the display image is anticipated (YES in step S11), and proceeds to step S12.

In step S12, the control system 250 estimates the pulse driving condition that would be selected after the switching, performs in steps S13-15 of FIG. 14A processes corresponding to processes of steps S5-S7 of FIG. 7A, respectively, for the estimated pulse driving condition that would be selected, and ends the process.

Figure 14B:
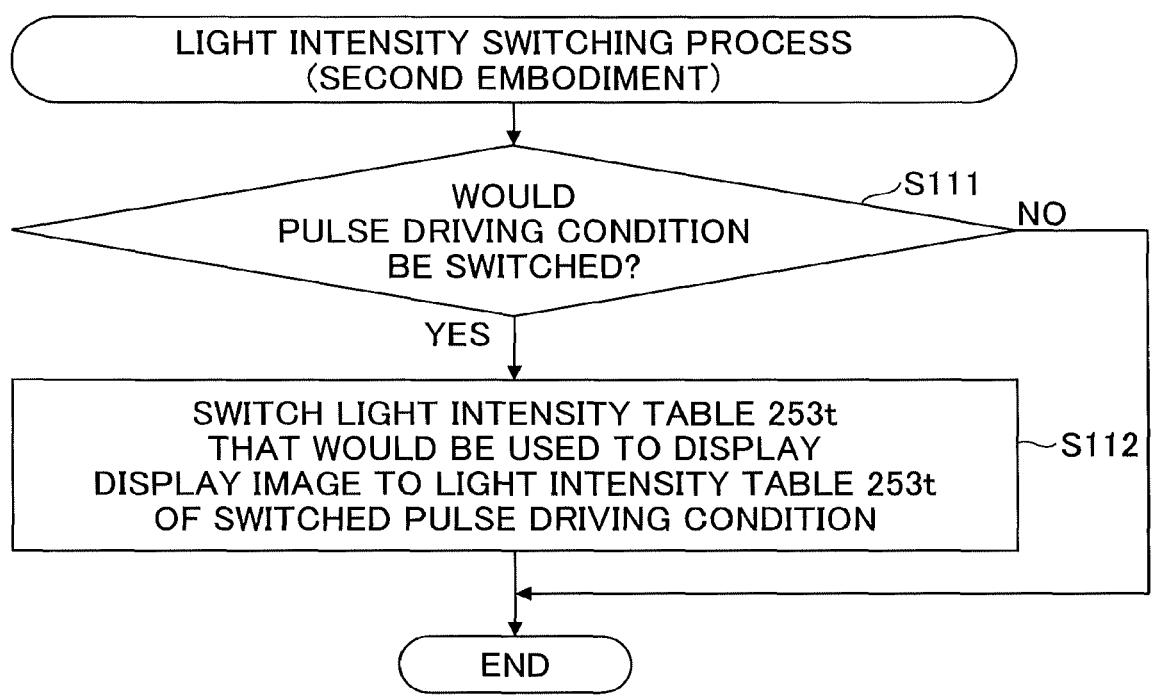
FIG. 14B is a flowchart illustrating an example of a light intensity table switching process implemented by the control system 250 according to the second embodiment.

FIG. 14B is a flowchart illustrating an example of the light intensity table switching process implemented by the control system 250 according to the second embodiment. The process of FIG. 14B is implemented by the control system 250 for each frame of the display image, for example.

In step S111, the control system 250 determines whether to switch the pulse driving condition. The determination in step S111 is implemented on the basis of information obtained from, for example, the various peripheral apparatuses of the HUD 200 of FIG. 6 in the same way as step S11 mentioned above. For example, by obtaining the road conditions from the vehicle navigation apparatus 400 of FIG. 6 or photographing the forward view of the vehicle 301 with the forward shooting camera 110, it can be anticipated that, for example, the vehicle 301 would travel into a tunnel. In this case, in step S111, the control system 250 determines to switch the pulse driving condition to reduce the brightness of the display image (YES in step S111), and proceeds to step S112.

In response to the determination result NO in step S111, the control system 250 ends the process.

In step S112, the control system 250 switches the light intensity table 253t used to display the display image to the light intensity table 253t for the pulse driving condition to which the control system has determined in step S111 to switch.

Thereafter, the control system 250 controls the control currents of the laser light sources 201R, 201G, and 201B with the use of the light intensity table 253t for which the switching has been performed, to display the display image of the frame.

Note that the control system 250 performs step S11 of FIG. 14A and step S111 of FIG. 14B as substantially the same process, and thereafter, performs the updating process in steps S12-S15 of FIG. 14A first. After the light intensity table 253t is thus updated, the control system 250 switches in step S112 of FIG. 14B the light intensity table 253t used to display the display image to the updated light intensity table 253t. As a result, the control system 250 updates the light intensity table 253t that would be selected, immediately before the vehicle 301 travels into the tunnel for example, and displays the display image with the use of the updated light intensity table 253t in the tunnel.

Because the light intensity table 253t that would be selected is updated immediately before being selected, it is possible to display the display image with high preciseness while efficiently maintaining white balance.

In addition, in step S14, during scanning of the area outside the display image by the optical scanning apparatus 208, the control system 250 selects the pulse driving condition that would be selected, which is different from the pulse driving condition that is used to display the display image, and performs pulse modulation on laser light from the laser light sources 201R, 201G, and 201B. At the same time, the control system 250 obtains the light intensities from the power monitoring PD 206. Thus, during displaying of the display image, relationships between the light intensities and the control currents for the pulse driving condition different from the pulse driving condition that is used to display the display image are obtained. Thus, it is possible to efficiently update the light intensity table 253t.

In the above-described process, the control system 250 may estimate a timing to switch the pulse driving condition in step S112 of FIG. 14B at a time of anticipation in step S11. In this case, the control system 250 may start the process of step S12 and the subsequent steps prior to the estimated timing by a period required to update the light intensity table.

As described above, the HUD 200 of the present embodiment is included in an on-vehicle system together with the vehicle navigation apparatus 400 from which information to be provided to the vehicle driver by the display image is obtained. The HUD 200 can determine whether to update the light intensity table 253t on the basis of information obtained by the vehicle navigation apparatus 400. In this case, it is possible to update the light intensity tables 253t efficiently by using the information from the vehicle navigation apparatus 400.

[Variant]

It is possible to combine the above-described first embodiment and second embodiment.

For example, the control system 250 performs a process of FIGS. 7A and 7B for a case where any situation causing a determination result YES in step S11 of FIG. 14A does not occur, whereas the control system 250 generates an "interrupt" to a process of FIGS. 7A and 7B for a case where a situation causing a determination result YES in step S11 of FIG. 14A occurs. As a result of the "interrupt", the control system 250 performs a process of FIGS. 14A and 14B. After the process of FIGS. 14A and 14B ends, the control system 250 returns to the process of FIGS. 7A and 7B.

Further, in the above-described embodiments, in the light source unit 220 of FIG. 4, the single power monitoring PD 206 is used as a light intensity detector. However, this configuration may be changed. That is, the power monitoring PD 206 need not be installed in the light source unit 220. For example, the power monitoring PD 206 may be installed at a position outside the light source unit 220 such that beams after scanning by the optical scanning apparatus 208 are incident on the power monitoring PD 206.

Further, the number of power monitoring PD 206 is not limited to one. A plurality of power monitoring PDs 206 may be used. For example, light paths on which the respective power monitoring PDs 206 are installed may be determined in such a manner that beams from the respective laser light sources 201B, 201R, and 201G before being combined by the combining device 204 are detected separately. In this case, in step S6 of FIG. 7A and in step S14 of FIG. 14A, it is possible to detect the light intensities of the laser light sources 201B, 201R, and 201G of the respective colors simultaneously.

In the above-described embodiments, the automotive HUD 200 has been described as an example of an image display apparatus according to the present invention. However, an image display apparatus according to the present invention is not limited to the automotive HUD 200. For example, an image display apparatus according to the present invention may be a HUD installed in another mobile body such as an airplane. Further, an image display apparatus according to the present invention may be a HUD that displays a display image through a window, for a case where a viewer views a mobile body (for example, sushi in a revolving sushi bar) through the window. Furthermore, an image display apparatus is not limited to a HUD. For example, image display apparatuses may be various HMD (head-mounted displays).

Thus, image display apparatuses, on-vehicle systems, and image display methods have been described in the embodiments. However, the present invention is not limited to the embodiments, and various modifications and improvements can be made within the scope of the present invention.

RELATED ART DOCUMENT

Patent Document

Patent Document No. 1: Japanese Unexamined Patent Application Publication No. 2014-132295

What is claimed is:

1. An image display apparatus, comprising:
   a light source that includes a plurality of light source devices emitting light of a plurality of colors having mutually different wavelengths;
   an optical scanner to scan a predetermined scanning zone with the light from the light source to render a display image;
   a light intensity detector to detect a light intensity of the light from the light source for each light source device of the plurality of light source devices;
   a memory configured to, on a per light source device basis for each pulse driving condition of a plurality of pulse driving conditions in which each pulse driving condition is for pulse modulation of light emitted by the light source, wherein the pulse modulation is performed on a per light source basis and the pulse driving condition is switched as outside light changes, store relationships between control currents provided to the light source and light intensities; and
   one or more processors configured to
      select a pulse driving condition, corresponding to a condition of the outside light from the plurality of pulse driving conditions;
      supply a control current applied to each light source to perform, on the per light source device basis, the pulse modulation on the light according to the selected pulse driving condition to control a brightness of the display image;
      adjust, on the per light source device basis based on the relationships and according to the selected pulse driving condition, the control current applied to each light source to adjust the brightness of the display image depending on the condition of outside light while maintaining white balance even with a change in the condition of outside light; and
      in a case that the optical scanner scans an area outside of the display image, control the light intensity detector to detect a light intensity of the light to scan and update the relationships stored in the memory based on the light intensity.

2. The image display apparatus according to claim 1, wherein the relationships between the control currents and the light intensities are stored in the memory as a data table where the control currents are associated with the light intensities for each of the pulse driving conditions.

3. The image display apparatus according to claim 1, wherein the one or more processors are further configured to
   in a case that the optical scanner scans the area outside the display image, modify light emitted by the light source, on the per light source device basis, under a pulse driving condition different from a pulse driving condition under which the display image is displayed, and
   detect a light intensity of the light by the light intensity detector.

4. The image display apparatus according to claim 1, wherein the one or more processors are further configured to update the relationships between the control currents and the light intensities for each of the light source devices.

5. The image display apparatus according to claim 1, wherein particular light, with which the area outside of the display image in the scanning zone is scanned, is blocked for a viewer who views the display image.

6. The image display apparatus according to claim 1, wherein the one or more processors are further configured to, in a case that the optical scanner scans the area outside the display image, gradually change the control current in such a manner that a light intensity of light detected by the light intensity detector reaches a predetermined light intensity.

7. The image display apparatus according to claim 1, wherein the light source emits light in a time-sharing manner for each of pixels included in the display image according to the control current.

8. The image display apparatus according to claim 1, wherein the one or more processors are further configured to
   update the relationships between control currents and light intensities stored in the memory during a display of the display image, and
   control the render of the display image with the use of updated relationships.

9. The image display apparatus according to claim 1, wherein the image display apparatus is a head-up display (HUD) to display the display image on a windshield of a vehicle or a combiner.

10. An on-vehicle system, comprising:
   the image display apparatus according to claim 1; and
   an information obtaining apparatus to obtain information to provide to a driver of a vehicle by the display image.

11. The on-vehicle system according to claim 10, wherein the image display apparatus determines, based on the information obtained by the information obtaining apparatus, whether to update the relationships stored in the memory.

12. An image display method implemented by an image display apparatus, the image display method comprising:
   emitting light, from a light source that includes a plurality of light source devices, of a plurality of colors having mutually different wavelengths;
   scanning a predetermined scanning zone with the light from the light source to render a display image;
   detecting a light intensity of the light from the light source for each light source device of the plurality of light source devices;
   storing, in a memory on a per light source device basis for each pulse driving condition of a plurality of pulse driving conditions in which each pulse driving condition is for pulse modulation of light emitted by the light source, wherein the pulse modulation is performed on a per light source basis and the pulse driving condition is switched as outside light changes, relationships between control currents provided to the light source and light intensities;

selecting, by the one or more processors, a pulse driving condition corresponding to a condition of the outside light from the plurality of pulse driving conditions;

supplying, by the one or more processors, a control current applied to each light source to perform, on a per light source basis, the pulse modulation of the light according to the selected pulse driving condition to control a brightness of the display image;

adjusting, by the one or more processors on a per light source basis based on the relationships and according to the selected pulse driving condition, the control current applied to each light source to adjust the brightness of the display image depending on the condition of outside light while maintaining white balance even with a change in the condition of outside light; and upon scanning an area outside of the display image, detecting a light intensity of the light to scan and updating, by the one or more processors based on the light intensity, the relationships stored in the memory.

\* \* \* \* \*